United States Patent
Tazume

(10) Patent No.: US 11,775,917 B2
(45) Date of Patent: Oct. 3, 2023

(54) INFORMATION PROCESSING DEVICE, SYSTEM, AND METHOD

(71) Applicant: Rakuten Group, Inc., Tokyo (JP)

(72) Inventor: Toshiaki Tazume, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 109 days.

(21) Appl. No.: 17/362,093

(22) Filed: Jun. 29, 2021

(65) Prior Publication Data

US 2022/0067647 A1     Mar. 3, 2022

(30) Foreign Application Priority Data

Aug. 31, 2020   (JP) ................................. 2020-145157

(51) Int. Cl.
| | | |
|---|---|---|
| G06Q 10/0832 | (2023.01) | |
| G01W 1/00 | (2006.01) | |
| B64C 39/02 | (2023.01) | |
| B64U 101/60 | (2023.01) | |

(52) U.S. Cl.
CPC ....... G06Q 10/0832 (2013.01); B64C 39/024 (2013.01); G01W 1/00 (2013.01); *B64U 2101/60* (2023.01)

(58) Field of Classification Search
CPC ................................................. G06Q 10/0832
USPC ....................................................... 705/332
See application file for complete search history.

(56) References Cited

U.S. PATENT DOCUMENTS

| | | | | |
|---|---|---|---|---|
| 9,387,928 | B1* | 7/2016 | Gentry | ............... B60L 53/00 |
| 2018/0217598 | A1* | 8/2018 | Kuhara | ............ G06Q 10/0834 |
| 2018/0364714 | A1* | 12/2018 | Anderson | ............ G05D 1/0027 |
| 2019/0242716 | A1* | 8/2019 | N | ..................... G06Q 10/0832 |
| 2020/0047883 | A1* | 2/2020 | Lesser | .................. G06Q 10/02 |
| 2020/0117217 | A1* | 4/2020 | Yuzawa | .......... B60W 60/00256 |

FOREIGN PATENT DOCUMENTS

| | | | |
|---|---|---|---|
| JP | 2018-39420 A | 3/2018 | |
| JP | 2018-151923 A | 9/2018 | |
| JP | 2018-165932 A | 10/2018 | |
| WO | WO-2018112301 A1 * | 6/2018 | ............. B60P 3/007 |

OTHER PUBLICATIONS

Drone-Enabled Weather-Based Package Re-Collection, Feb. 12, 2020, The IP.com Journal, pp. 1-3. https://ip.com/IPCOM/000261235. (Year: 2020).*

* cited by examiner

*Primary Examiner* — Jeff Zimmerman
*Assistant Examiner* — Hunter A Molnar
(74) *Attorney, Agent, or Firm* — Sughrue Mion, PLLC

(57) ABSTRACT

[Problem] Provided are an information processing device, a system, and a method that are capable of, based on weather, determining the type of an article that is transportable by a vehicle.

[Solution] An information processing device (500) includes an acquirer (510) that acquires weather information indicating weather in an area in which a vehicle is scheduled to move and a determiner (540) that, based on the acquired weather information, determines a type of an article that is transportable by the vehicle in the area.

13 Claims, 25 Drawing Sheets

FIG. 6

FORECAST TABLE

|   | PERIOD OF TIME | WEATHER |
|---|---|---|
| 1 | 09:00-09:30 | STRONG WIND, RAIN |
| 2 | 09:30-10:00 | STRONG WIND, CLEAR |
| 3 | 10:00-10:30 | CLEAR |
| 4 | 10:30-11:00 | SNOW |
| 5 | 11:00-11:30 | LOW TEMPERATURE, CLEAR |
|   | ... | ... |

FIG. 8

ARTICLE TABLE

| | ARTICLE ID | NAME OF ARTICLE | TYPE |
|---|---|---|---|
| 1 | G11 | CLOCK | PRECISION EQUIPMENT |
| 2 | G12 | PERSONAL COMPUTER | PRECISION EQUIPMENT |
| 3 | G21 | SHIRT | CLOTHES |
| 4 | G31 | CANNED COFFEE | HOT DRINK |
| 5 | G41 | POTATO CHIPS | SNACK |

FIG. 9

TYPE TABLE

| | TYPE | CONDITION |
|---|---|---|
| 1 | PRECISION EQUIPMENT | WETTING |
| 2 | PRECISION EQUIPMENT | SHAKING |
| 3 | CLOTHES | WETTING |
| 4 | HOT DRINK | LOW TEMPERATURE |

FIG. 10

WEATHER TABLE

|   | WEATHER | CONDITION |
|---|---|---|
| 1 | STRONG WIND | SHAKING |
| 2 | RAIN | WETTING |
| 3 | SNOW | WETTING |
| 4 | SNOW | LOW TEMPERATURE |
| 5 | LOW ATMOSPHERIC TEMPERATURE | LOW TEMPERATURE |

FIG. 11

PERFORMANCE TABLE

|   | VEHICLE ID | VEHICLE PERFORMANCE | | |
|---|---|---|---|---|
|   |   | WIND-RESISTANT PERFORMANCE | WATERPROOF PERFORMANCE | HEAT RETENTION PERFORMANCE |
| 1 | 800 | No | Yes | Yes |
| 2 | 900 | Yes | No | No |

FIG. 12

CONDITION TABLE

| | VEHICLE PERFORMANCE | CONDITION |
|---|---|---|
| 1 | WIND-RESISTANT PERFORMANCE | SHAKING |
| 2 | WATERPROOF PERFORMANCE | WETTING |
| 3 | HEAT RETENTION PERFORMANCE | LOW TEMPERATURE |

FIG. 13

SCHEDULE TABLE

| | PERIOD OF TIME | VEHICLE ID | ARTICLE ID |
|---|---|---|---|
| 1 | 09:00-09:30 | 800 | G21 |
| 2 | 09:30-10:00 | 900 | G12 |
| 3 | 10:00-10:30 | 800 | G11 |
| 4 | 10:30-11:00 | 900 | NULL |
| 5 | 11:00-11:30 | 800 | NULL |
| 6 | 11:30-12:00 | 800 | NULL |
| | ... | ... | ... |

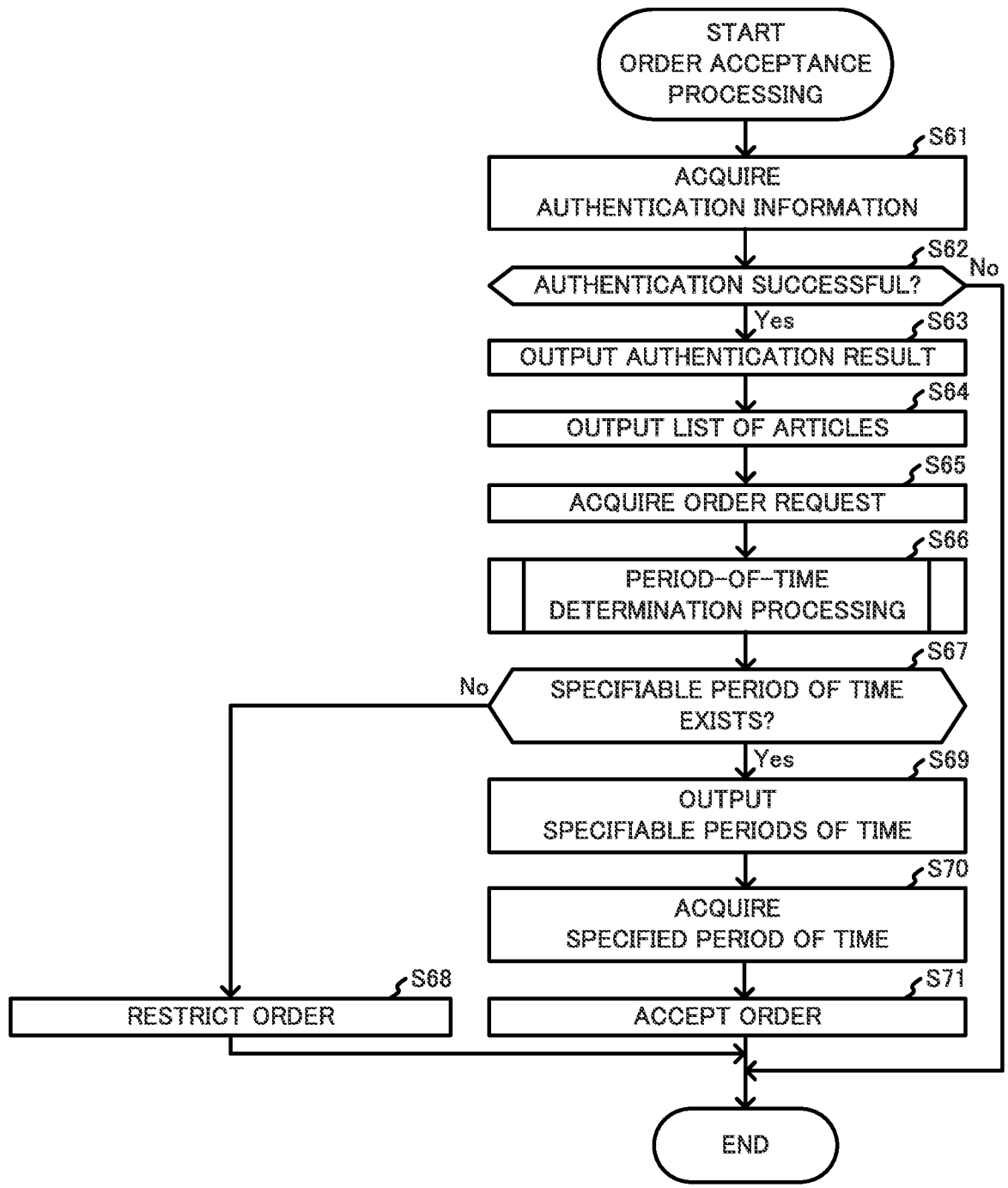

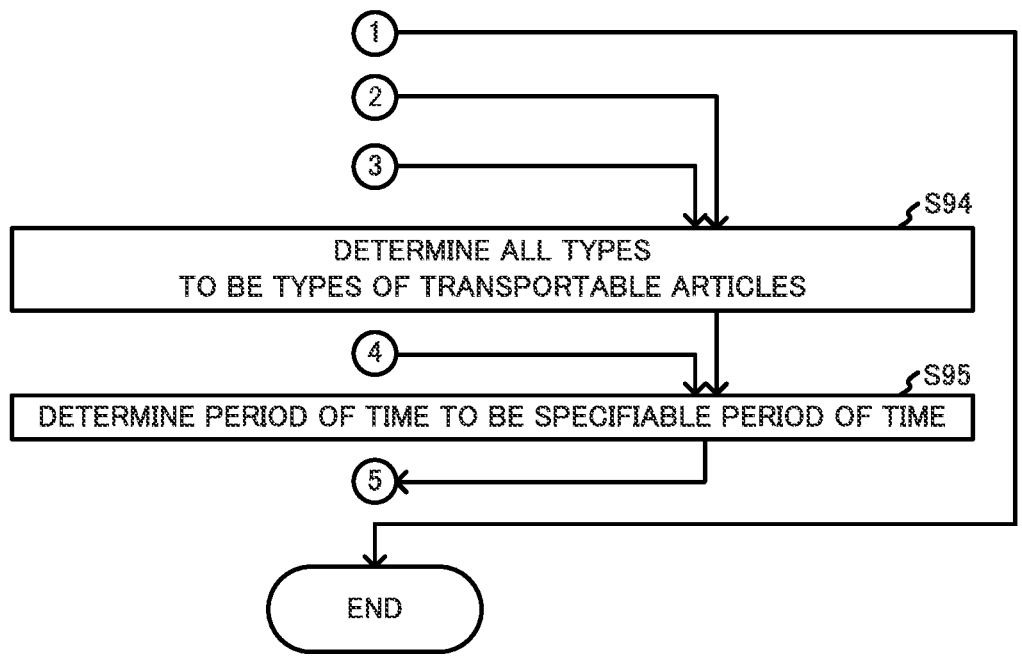

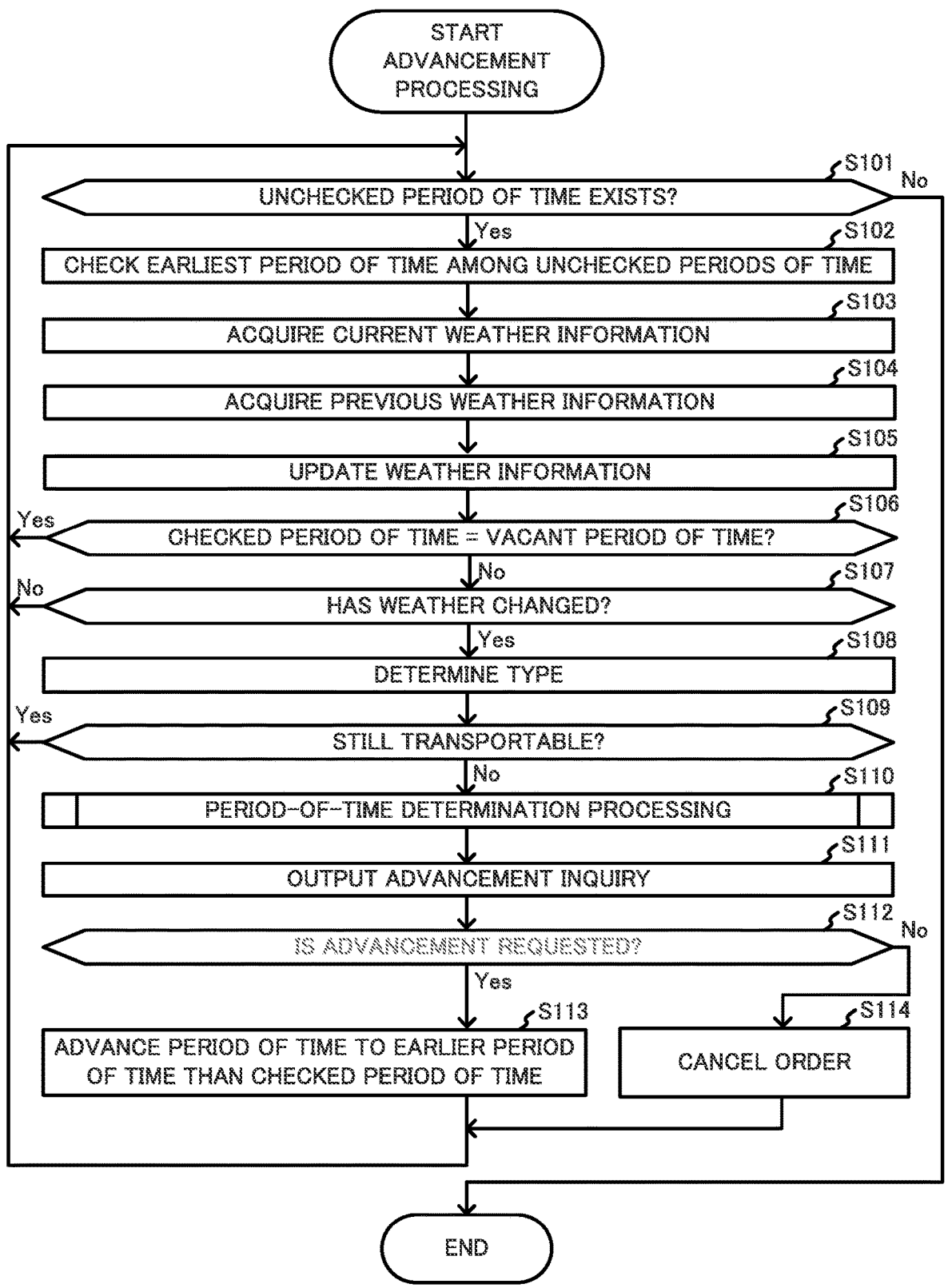

INFORMATION PROCESSING DEVICE, SYSTEM, AND METHOD

TECHNICAL FIELD

The present disclosure relates to an information processing device, a system, and a method.

BACKGROUND ART

Conventionally, a system that displays articles, based on attribute information of customers including age and gender and causes a vehicle to transport an article ordered from among the displayed articles has been known (for example, Patent Literature 1).

CITATION LIST

Patent Literature

Patent Literature 1: Unexamined Japanese Patent Application Publication No. 2018-151923

SUMMARY OF INVENTION

Technical Problem

The type of an article that is transportable by a vehicle may differ depending on weather. However, there has been a problem in that the system described in Patent Literature 1 that causes a vehicle to transport an article that is displayed based on the attribute information of a customer and that is ordered is incapable of determining the type of an article that is transportable by the vehicle, based on weather.

The present disclosure has been made in consideration of the above-described problem, and an objective of the present disclosure is to provide an information processing device, a system, and a method that are capable of, based on weather, determining the type of an article that is transportable by a vehicle.

Solution to Problem

In order to achieve the above-described objective, an information processing device according to a first aspect of the present disclosure is characterized by including:
an acquirer that acquires weather information indicating weather in an area in which a vehicle is scheduled to move; and,
a determiner that, based on the acquired weather information, determines a type of an article that is transportable by the vehicle in the area.

Advantageous Effects of Invention

An information processing device, a system, and a method according to the present disclosure enables the type of an article that is transportable by a vehicle to be determined based on weather.

BRIEF DESCRIPTION OF DRAWINGS

FIG. 6 is a diagram illustrating an example of a forecast table that the information processing device stores;

FIG. 8 is a diagram illustrating an example of an article table that the information processing device stores;

FIG. 9 is a diagram illustrating an example of a type table that the information processing device stores;

FIG. 10 is a diagram illustrating an example of a weather table that the information processing device stores;

FIG. 11 is a diagram illustrating an example of a performance table that the information processing device stores;

FIG. 12 is a diagram illustrating an example of a condition table that the information processing device stores;

FIG. 13 is a diagram illustrating an example of a schedule table that the information processing device stores;

FIG. 21 is a flowchart illustrating an example of order acceptance processing that an information processing device according to Embodiment 2 executes;

FIGS. 22A and 22B are a flowchart illustrating an example of period-of-time determination processing that the information processing device executes;

FIG. 23 is a flowchart illustrating an example of advancement processing that an information processing device according to Embodiment 3 executes.

DESCRIPTION OF EMBODIMENTS

Embodiment 1

Hereinafter, Embodiment 1 of the present disclosure will be described with reference to the drawings.

Figure 1:
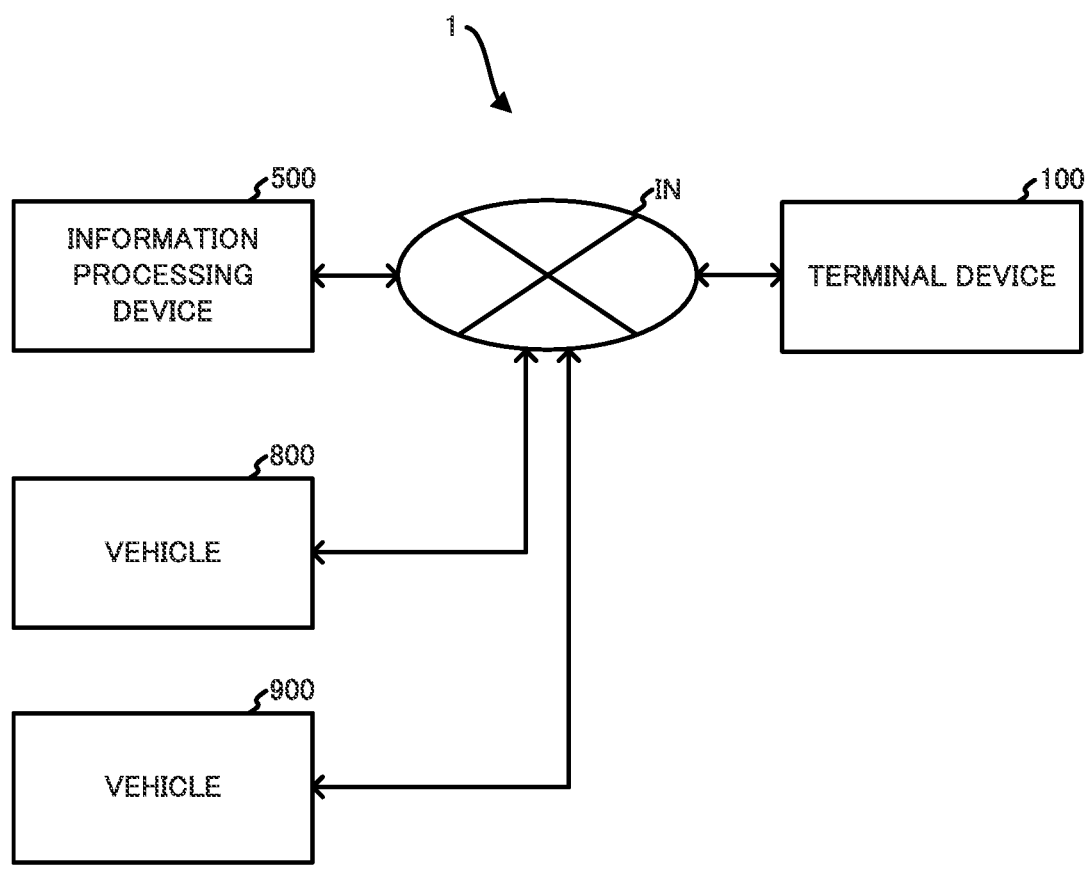
FIG. 1 is a system configuration diagram illustrating a configuration example of a transport system according to Embodiment 1 of the present disclosure.

A transport system 1 according to Embodiment 1 of the present disclosure includes a terminal device 100, as illustrated in FIG. 1, that is operated by an orderer who orders an article, an information processing device 500 that accepts an order, and vehicles 800 and 900 each of which transports the article, by storing an article the order of which has been accepted and by moving.

Figure 2:
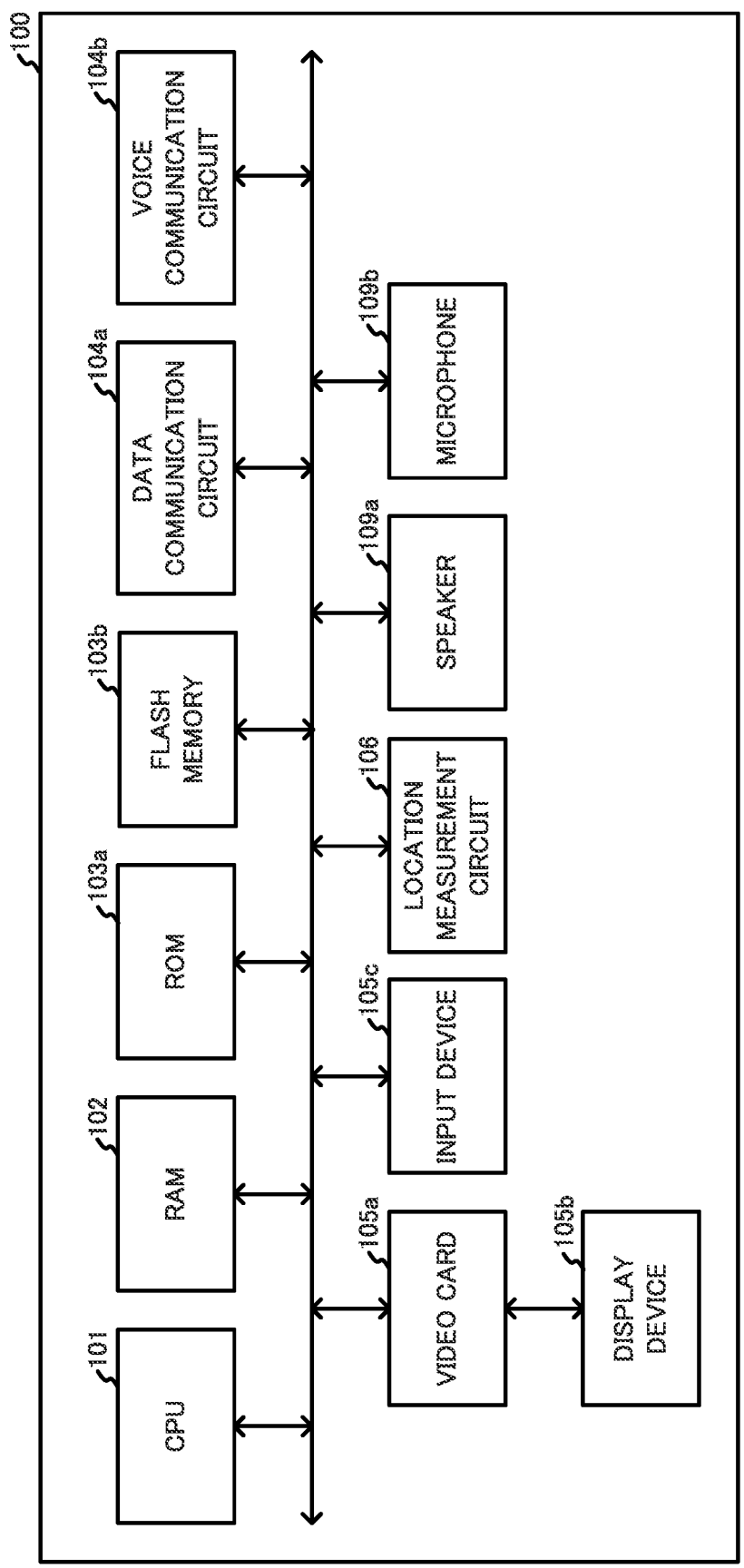
FIG. 2 is a hardware configuration diagram illustrating a configuration example of a terminal device.

The terminal device 100 is, for example, a smartphone and is carried by the orderer. As illustrated in FIG. 2, the terminal device 100 includes a central processing unit (CPU) 101, a random access memory (RAM) 102, a read only memory (ROM) 103*a*, a flash memory 103*b*, a data communication circuit 104*a*, a voice communication circuit 104*b*, a video card 105*a*, a display device 105*b*, an input device 105*c*, a location measurement circuit 106, a speaker 109*a*, and a microphone 109*b*.

Although, in the present embodiment, description will be made assuming that the terminal device 100 includes one CPU 101, the present embodiment is not limited thereto, and the terminal device 100 may include a plurality of CPUs. In addition, the terminal device 100 may include a plurality of RAMs and may include a plurality of flash memories.

The CPU 101 of the terminal device 100 performs overall control of the terminal device 100 by executing programs stored in the ROM 103*a* or the flash memory 103*b*. The RAM 102 temporarily stores data to be processed at the time of execution of the programs by the CPU 101.

The ROM 103*a* and the flash memory 103*b* of the terminal device 100 store various types of programs. The flash memory 103*b* further stores various types of data that are used in the execution of the programs and tables in which data are stored. The terminal device 100 may include a hard disk in place of the flash memory 103*b*.

The data communication circuit 104*a* of the terminal device 100 is, for example, a network interface card (NIC) and, in accordance with a communication standard, such as long term evolution (LTE) and 5th generation (5G), performs data communication with a not-illustrated base station that is connected to the Internet IN, using radio waves. In this way, the data communication circuit 104*a* of the terminal device 100 performs data communication with the information processing device 500 connected to the Internet IN. The voice communication circuit 104*b* performs voice communication with a not-illustrated base station, using radio waves.

The video card 105*a* of the terminal device 100 renders images, based on digital signals output from the CPU 101 and also outputs image signals that represent the rendered images. The display device 105*b* is an electroluminescence (EL) display and displays images in accordance with the image signals output from the video card 105*a*. The terminal device 100 may include a plasma display panel (PDP) or a liquid crystal display (LCD) in place of the EL display. The input device 105*c* is one or more of a touch pad and a button and inputs a signal corresponding to an operation by the orderer.

The location measurement circuit 106 of the terminal device 100 is a quasi-zenith satellite system (QZSS) circuit. The location measurement circuit 106 receives signals emitted from quasi-zenith satellites, measures latitude, longitude, and altitude indicating a location of the terminal device 100, based on the received signals, and outputs a signal indicating the measured latitude, longitude, and altitude. The location measurement circuit 106 may be, instead of the QZSS circuit, a global positioning system (GPS) circuit that receives signals emitted by GPS satellites and measures latitude, longitude, and altitude indicating a location of the terminal device 100, based on the received GPS signals.

The speaker 109*a* of the terminal device 100 outputs sound in accordance with a signal output by the CPU 101, and the microphone 109*b* of the terminal device 100 outputs a signal representing ambient sound around the terminal device 100.

Figure 3:
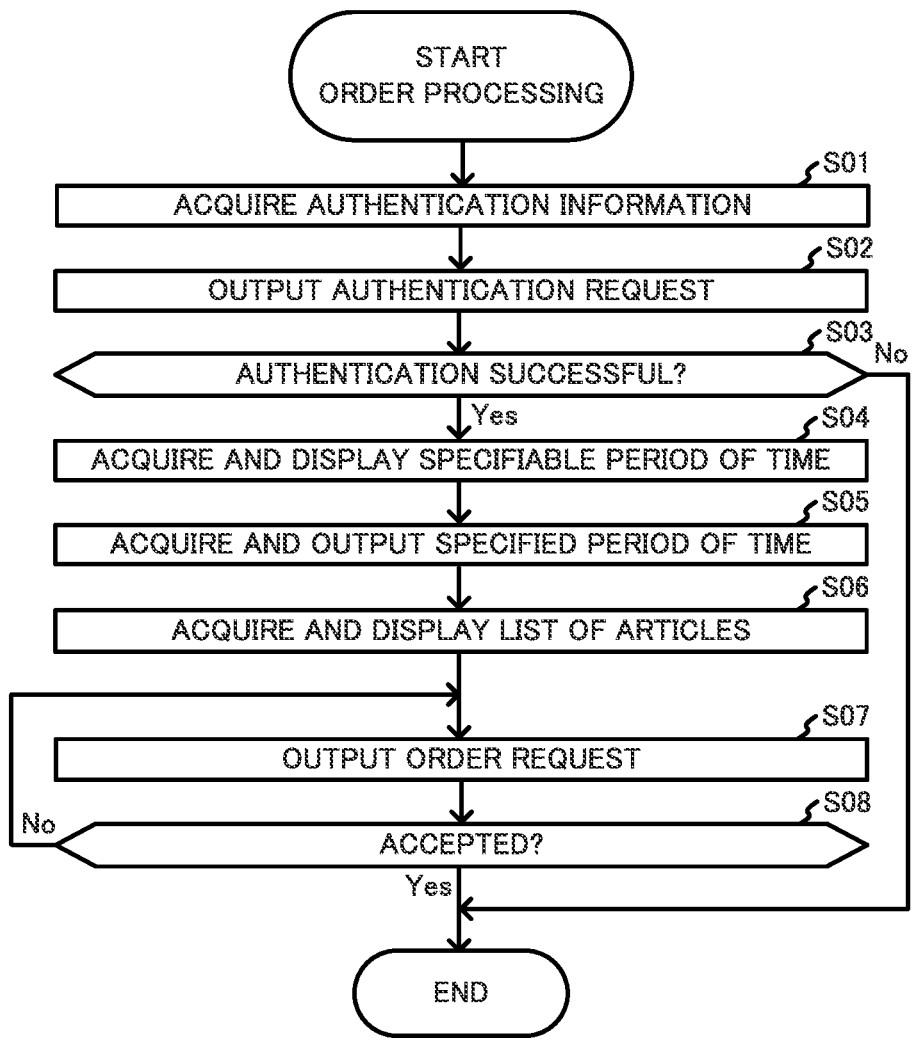
FIG. 3 is a flowchart illustrating an example of order processing that the terminal device executes.

When the orderer operates the input device 105*c* of the terminal device 100 in order to order an article, the input device 105*c* outputs a signal corresponding to the operation. When the signal is output, the CPU 101 of the terminal device 100 executes order processing as illustrated in FIG. 3.

When starting the execution of the order processing, the CPU 101 of the terminal device 100 causes the display device 105*b* to display a display prompting the orderer to input authentication information including a user identification (ID) and a password. Subsequently, when the orderer who has visually recognized the display operates the input device 105*c* in order to input authentication information, the CPU 101 acquires information representing the user ID and password of the orderer, based on a signal output from the input device 105*c* and sets the acquired information as authentication information (step S01).

Next, the CPU 101 of the terminal device 100 outputs an authentication request that includes the authentication information and that requests user authentication based on the authentication information to the data communication circuit 104*a* with the information processing device 500 as the destination (step S02).

When no information indicating that the authentication has succeeded has been received when or before a predetermined period has elapsed since the data communication circuit 104*a* of the terminal device 100 sent the authentication request to the information processing device 500, the CPU 101 determines that the authentication has not succeeded (step S03; No) and terminates the execution of the order processing.

In contrast, when the data communication circuit 104*a* of the terminal device 100 receives information indicating that the authentication has succeeded when or before a predetermined period has elapsed since the data communication circuit 104*a* sent the authentication information, the CPU 101 determines that the authentication has succeeded (step S03; Yes). Subsequently, the CPU 101 sleeps until the data communication circuit 104*a* receives information indicating a period of time that can be specified as a period of time during which an article is to be transported (hereinafter, referred to as a specifiable period of time) from the information processing device 500. When one or a plurality of pieces of information indicating specifiable periods of time is received, the CPU 101 acquires the received one or plurality of pieces of information from the data communication circuit 104*a* and causes the display device 105*b* to display one or a plurality of periods of time that is respectively indicated by the acquired one or plurality of pieces of information (step S04).

Next, when the orderer who has visually recognized the one or plurality of periods of time operates the input device 105*c* of the terminal device 100 in order to specify a period of time, the CPU 101 acquires information indicating a period of time specified by the orderer (hereinafter, referred to as a specified period of time), based on a signal output from the input device 105*c*. Subsequently, the CPU 101 outputs the information indicating the specified period of time to the data communication circuit 104*a* with the information processing device 500 as the destination (step S05).

The data communication circuit 104*a* of the terminal device 100, after having sent the information indicating the specified period of time to the information processing device 500, receives information indicating a list that includes a plurality of names of articles to be sold and article IDs identifying the articles.

The CPU 101 of the terminal device 100 acquires the information indicating the list from the data communication circuit 104a and, based on the acquired information, causes the display device 105b to display the list including a plurality of names and article IDs of articles (step S06).

Subsequently, when the orderer who has visually recognized the displayed list operates the input device 105c of the terminal device 100 in order to order an article, the CPU 101 acquires an article ID of an article to be ordered, based on a signal output from the input device 105c. Although, in the present embodiment, in order to simplify description, it is described that an orderer requests transport of one article in one order, the present embodiment is not limited thereto.

Subsequently, the CPU 101 of the terminal device 100 generates an order request that requests acceptance of an order requesting an article identified by the acquired article ID to be transported to a transport destination during a specified period of time indicated by the information acquired in step S05. Although, in the present embodiment, transporting an article during a specified period of time means that both the start time of the transport and the end time of the transport are included within the specified period of time, the present embodiment is not limited thereto, and the start time of the transport may be a time earlier than the specified period of time.

Subsequently, the CPU 101 of the terminal device 100 adds the article ID and the information indicating the specified period of time to the generated order request and subsequently outputs the order request to the data communication circuit 104a with the information processing device 500 as the destination (step S07).

When the data communication circuit 104a of the terminal device 100, after having sent the order request to the information processing device 500, receives a restriction notification notifying that acceptance of the order has been restricted, the CPU 101 of the terminal device 100 acquires the restriction notification from the data communication circuit 104a. Next, the CPU 101 determines, based on the acquired restriction notification, that the order has not been accepted (step S08; No) and causes the display device 105b to display a message indicating that the order has not been accepted.

The orderer visually recognizes the display on the display device 105b of the terminal device 100 and operates the input device 105c again in order to order an article different from the article the order of which has not been accepted. Subsequently, the CPU 101 repeats the above-described processing from step S07.

In contrast, when the data communication circuit 104a of the terminal device 100 receives an acceptance notification notifying that the order has been accepted, the CPU 101 acquires the acceptance notification from the data communication circuit 104a. Next, the CPU 101 determines, based on the acquired acceptance notification, that the order has been accepted (step S08; Yes), causes the display device 105b to display a message indicating that the order has been accepted, and subsequently terminates the execution of the order processing.

Figure 4:
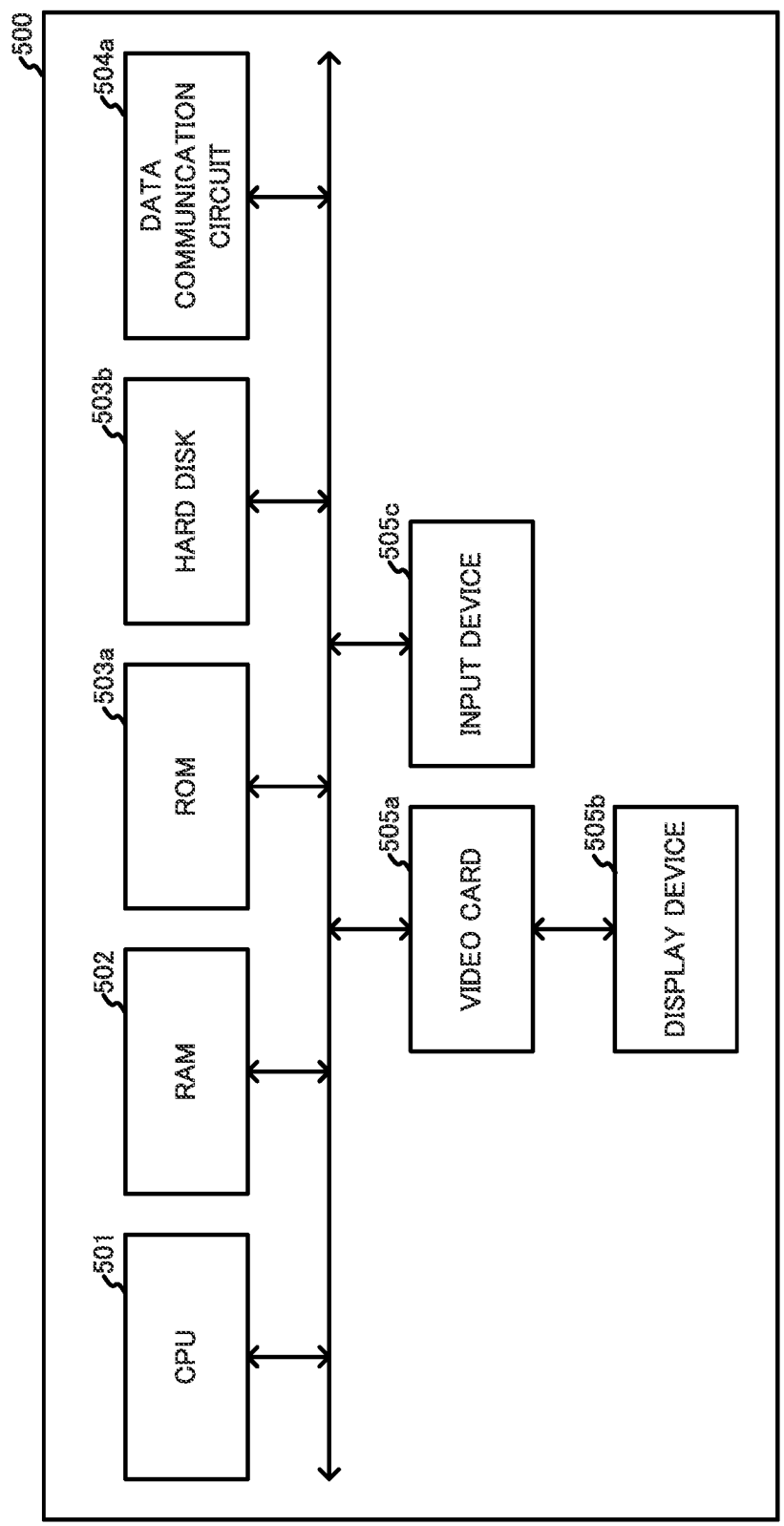
FIG. 4 is a hardware configuration diagram illustrating a configuration example of an information processing device.

The information processing device 500 that receives an order request from the terminal device 100 is a server machine and is installed in an office of a sales company selling the articles. The information processing device 500 includes a CPU 501, a RAM 502, a ROM 503a, a hard disk 503b, a data communication circuit 504a, a video card 505a, a display device 505b, and an input device 505c, as illustrated in FIG. 4. Although, in the present embodiment, description will be made assuming that the information processing device 500 includes one CPU 501, the present embodiment is not limited thereto, and the information processing device 500 may include a plurality of CPUs. The information processing device 500 may include a plurality of RAMs and may include a plurality of hard disks.

Configurations and functions of the CPU 501, the RAM 502, the ROM 503a, the data communication circuit 504a, the video card 505a, the display device 505c, and the input device 505b of the information processing device 500 are the same as the configurations and functions of the CPU 101, the RAM 102, the ROM 103a, the data communication circuit 104a, the video card 105a, the display device 105c, and the input device 105b of the terminal device 100 illustrated in FIG. 2, respectively.

The hard disk 503b of the information processing device 500 stores, in advance, various types of programs, various types of data used in execution of the programs, and tables in which data are stored. The information processing device 500 may include a flash memory in place of the hard disk 503b.

The data communication circuit 504a of the information processing device 500 performs data communication with the terminal device 100 and the vehicles 800 and 900, which are connected to the Internet IN.

The input device 505c of the information processing device 500 is one or more of a keyboard, a mouse, a touch pad, and a button and inputs a signal corresponding to an operation by an employee working in the office.

Figure 5:
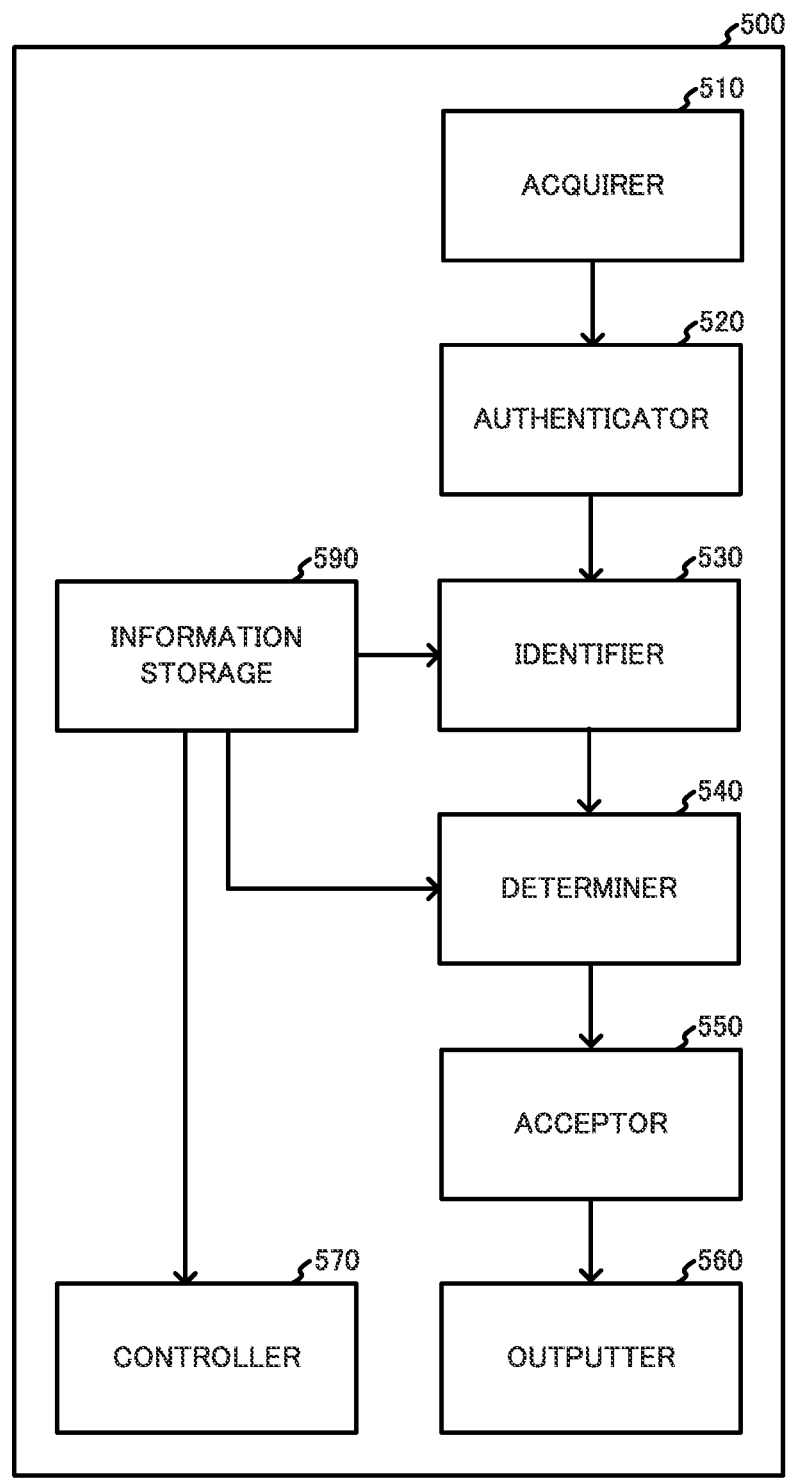
FIG. 5 is a functional block diagram illustrating an example of functions that the information processing device has.

When being started up, the CPU 501 of the information processing device 500 executes not-illustrated weather acquisition processing of acquiring weather information indicating forecasted weather in an area in which the vehicle 800 or 900 is scheduled to move to transport an article (hereinafter, referred to as a transport area), at a period of, for example, once every hour. Through this processing, the CPU 501 functions as an acquirer 510, as illustrated in FIG. 5, that acquires weather information. The hard disk 503b functions as an information storage 590 that stores, in advance, a forecast table, as illustrated in FIG. 6, in which weather information indicating forecasted weather is stored. In the forecast table, a plurality of records is stored in advance, and, in each record in the forecast table, information indicating a period of time and weather information indicating forecasted weather in the transport area during the period of time are associated with each other and stored.

When the execution of the weather acquisition processing is started, the acquirer 510 of the information processing device 500 acquires information indicating a transport area that the information storage 590 stores in advance. In the present embodiment, the transport area is an area that includes a predetermined transport route starting from the office in which an article is stored and reaching a transport destination predetermined by an administrator of the transport system 1.

Subsequently, the acquirer 510 of the information processing device 500 acquires a uniform resource locator (URL) of a weather forecast server that the information storage 590 stores in advance. The acquirer 510 also acquires information indicating the start time of the earliest period of time, information indicating the start time of the latest period of time, and information indicating time length of the periods of time that the information storage 590 stores in advance.

In the present embodiment, in order to simplify description, the following description will be made using, as a specific example, a case where the start time of the earliest period of time is set as "09:00" in advance, the start time of the latest period of time is set as "21:30" in advance, and the time length of the periods of time is set as "30 minutes" in advance. The reason why the time length of the periods of time is set as "30 minutes" is that the time required for the vehicles 800 and 900 to move from the office to a predetermined transport destination is less than 30 minutes.

Next, the acquirer 510 of the information processing device 500 sets a period of time "from 09:00 to 09:30", which lasts "30 minutes" from the start time "09:00" of the earliest period of time, as a target of a check. Subsequently, the acquirer 510 executes processing of generating a send request (i) including information indicating the period of time "from 09:00 to 09:30", which is currently checked, (hereinafter, referred to as a checked period of time) and information indicating the transport area and (ii) requesting sending of information that indicates a name of weather forecasted in the transport area during the checked period of time. Next, the acquirer 510 outputs the generated send request to the data communication circuit 504a with the URL of the weather forecast server as the destination.

When the data communication circuit 504a of the information processing device 500, after having sent the send request to the weather forecast server, receives information from the weather forecast server, the acquirer 510 of the information processing device 500 acquires the information from the data communication circuit 504a. In the present embodiment, the following description will be made using, as a specific example, a case where the name of weather forecasted in the transport area during the checked period of time "from 09:00 to 09:30" is "rain with strong wind."

The acquirer 510 of the information processing device 500 acquires, based on the acquired information, weather information indicating "strong wind" and weather information indicating "rain", which are included in the name of the forecasted weather. Subsequently, the acquirer 510 associates the information indicating the checked period of time "from 09:00 to 09:30" with the weather information indicating "strong wind" and the weather information indicating "rain" and stores the associated information in the forecast table in FIG. 6.

Subsequently, the acquirer 510 of the information processing device 500 checks a period of time that is a period of time immediately after the checked period of time and that has the predetermined time length "30 minutes." Next, the acquirer 510 repeats the above-described processing from the processing of generating a send request until the start time of a checked period of time becomes later than the start time of the predetermined latest period of time, and the information processing device 500 subsequently terminates the execution of the weather acquisition processing.

Figure 7:
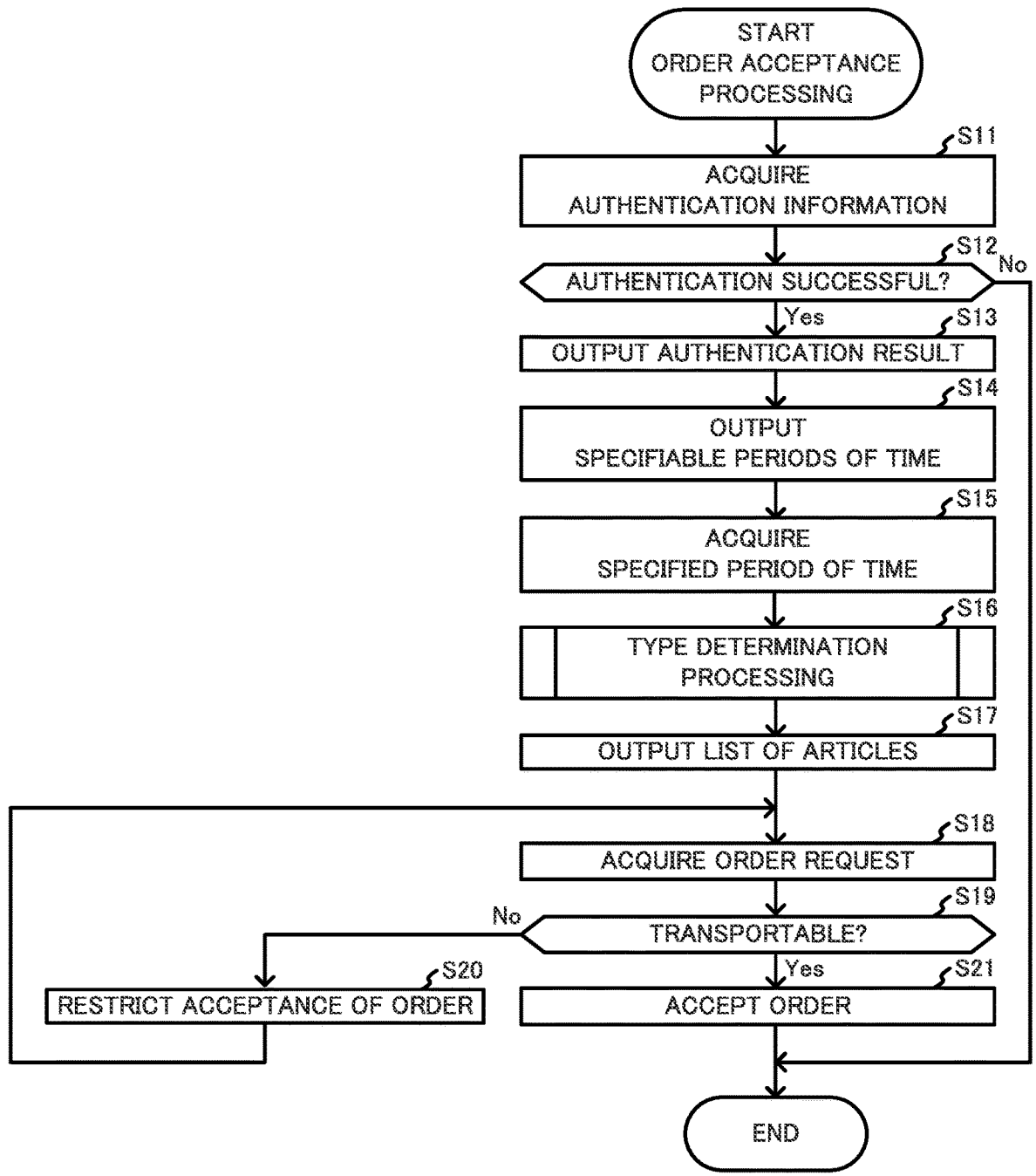
FIG. 7 is a flowchart illustrating an example of order acceptance processing that the information processing device according to Embodiment 1 executes.

When the data communication circuit 504a of the information processing device 500 receives an authentication request from the terminal device 100, the CPU 501 of the information processing device 500 performs user authentication in response to the authentication request and, when the user authentication succeeds, executes order acceptance processing, as illustrated in FIG. 7, of accepting an order in response to an order request sent from the terminal device 100.

Through this processing, the CPU 501 of the information processing device 500 functions as an authenticator 520, as illustrated in FIG. 5, that user-authenticates an orderer in response to an authentication request. The CPU 501 also functions as an identifier 530 that identifies a vehicle that is scheduled to transport an article during a specified period of time specified by the authenticated orderer, out of the vehicles 800 and 900. Further, the CPU 501 functions as a determiner 540 that determines a type of an article transportable in the transport area, based on vehicle performance of the identified vehicle 800 or 900 and weather in the transport area during the specified period of time.

Furthermore, the CPU 501 of the information processing device 500 functions as an acceptor 550 that accepts an order for an article of the type determined by the determiner 540 and that restricts acceptance of an order for an article of a type different from the type determined by the determiner 540.

In addition, the CPU 501 of the information processing device 500 functions as an outputter 560 that outputs a restriction notification notifying that acceptance of an order is restricted or an acceptance notification notifying that an order is accepted. Further, the CPU 501 functions as a controller 570 that performs control of causing an article the order of which has been accepted to be transported during the specified period of time on the vehicle 800 or 900 identified by the identifier 530.

The information storage 590 of the information processing device 500 stores, in advance, an article table, as illustrated in FIG. 8, in which information about articles is stored, as one of various types of tables used in the execution of the order acceptance processing. A plurality of records is stored in the article table in advance, and, in each record in the article table, an article ID identifying an article, information indicating the name of the article, and type information indicating the type of the article are associated with one another and stored in advance.

In the present embodiment, in order to simplify description, the following description will be made using, as a specific example, a case where, in the first record in the article table, an article ID "G11", information indicating a name "clock", and a type "precision equipment" are associated with one another in advance and stored. In addition, in the present embodiment, in the second record, an article ID "G12", information indicating a name "personal computer", and the type "precision equipment" are associated with one another, and, in the third record, an article ID "G21", information indicating a name "shirt", and a type "clothes" are associated with one another. Further, in the fourth record, an article ID "G31", information indicating a name "canned coffee", and a type "hot drink" are associated with one another, and, in the fifth record, an article ID "G41", information indicating a name "potato chips", and a type "snack" are associated with one another.

The information storage 590 of the information processing device 500 also stores, in advance, a type table, as illustrated in FIG. 9, in which information about types of articles is stored in advance. A plurality of records is stored in the type table in advance, and, in each record, type information indicating a type of an article and condition information indicating a condition that changes a state of the article from a deliverable state to an undeliverable state are associated with each other and stored in advance. The undeliverable state is a state that is different from the deliverable state.

In the present embodiment, in order to simplify description, the following description will be made using, as a specific example, a case where, in the first record in the type table, type information indicating the type name "precision equipment" of an article and condition information indicating a condition in which "wetting" occurs on an article are associated with each other in advance and stored. The reason why such pieces of information are associated with each other in advance is that, since the deliverable state of an article the type of which is "precision equipment" includes (i) a state in which the package of the article is dry and has not been wet and (ii) a normal state in which the article normally operates, the article or the package thereof getting wet with water causes the state of the article to change to the undeliverable state, which is different from the deliverable state. The reason why the deliverable state of an article the type of which is "precision equipment" includes (i) the state in which the package of the article is dry and has not been wet and (ii) the normal state in which the article normally operates is that delivering such an article to an orderer in such a state is explicitly or implicitly agreed between the orderer and the seller at the time of acceptance of an order or is required in commercial practice.

In addition, in the present embodiment, in the second record in the type table, type information indicating "precision equipment" and condition information indicating a condition in which "shaking" occurs on an article are associated with each other in advance and stored. The reason why such pieces of information are associated with each other in advance is that an article the type of which is "precision equipment" being shaken causes the state of the article to change from the normal state to a failed state in which the article does not normally operate.

Further, in the present embodiment, in the third record in the type table, type information indicating "clothes" and condition information indicating the condition in which "wetting" occurs on an article are associated with each other in advance and stored. The reason why such pieces of information are associated with each other in advance is that the deliverable state of an article the type of which is "clothes" includes a dry state in which the article or the package thereof is dry and has not been wet and the article or the package thereof getting wet with water causes the state of the article to change from the deliverable state to the undeliverable state.

In contrast, in the present embodiment, in the type table, type information indicating "clothes" and condition information indicating the condition in which "shaking" occurs on an article are not associated with each other. The reason why such pieces of information are not associated with each other is that, even when an article the type of which is "clothes" is shaken, the state of the article does not change from the deliverable state to the undeliverable state or a probability of the state of the article changing from the deliverable state to the undeliverable state is lower than a predetermined probability.

Further, in the present embodiment, in the fourth record in the type table, type information indicating "hot drink" and condition information indicating a condition "low temperature" in which temperature is lower than a predetermined temperature are associated with each other in advance and stored. The reason why such pieces of information are associated with each other in advance is that the deliverable state of an article the type of which is "hot drink" includes a warm temperature state in which temperature of the article is, for example, in a predetermined range from 55° C. to 65° C. and the article coming into contact with air having a temperature lower than 55° C. causes the state of the article to change to a state different from the warm temperature state.

In contrast, in the present embodiment, in the type table, type information indicating "hot drink" is neither associated with condition information indicating the condition in which "shaking" occurs on an article nor condition information indicating the condition in which "wetting" occurs on an article. The reason why such pieces of information are not associated with each other is that, since, among articles the orders of which the information processing device 500 accepts, an article the type of which is "hot drink" is contained in, for example, a plastic bottle or a can, the state of the article does not change from the deliverable state to the undeliverable state or a probability of the state of the article changing from the deliverable state to the undeliverable state is lower than a predetermined probability even when the article is shaken or gets wet with water.

Furthermore, in the present embodiment, the deliverable state of an article the type of which is "snack" includes a state in which a packaging bag packaging the snack is not broken, and, in the type table, no record in which type information indicating the type name "snack" is stored exists. This is because a packaging bag of an article the type of which is "snack" is not broken or a probability of the packaging bag being broken is lower than a predetermined probability even when the packaging bag is shaken, gets wet, or is brought into contact with low temperature air.

The information storage 590 of the information processing device 500 also stores, in advance, a weather table, as illustrated in FIG. 10, in which information about conditions generated by weather is stored in advance. A plurality of records are stored in the weather table in advance, and, in each record, weather information indicating weather and condition information indicating a condition generated by the weather are associated with each other and stored in advance.

In the present embodiment, in the first record in the weather table, weather information indicating a name "strong wind" of weather in which a wind having a speed faster than a predetermined wind speed blows and condition information indicating the condition in which "shaking" occurs on an article are associated with each other and stored in advance. In addition, in the second record, weather information indicating a weather name "rain" and condition information indicating the condition in which "wetting" occurs on an article are associated with each other and stored in advance.

In addition, in the present embodiment, in the third record in the weather table, weather information indicating a weather name "snow" and condition information indicating the condition in which "wetting" occurs on an article are associated with each other and stored in advance. Further, in the fourth record, weather information indicating the name "snow" and condition information indicating the condition "low temperature" are associated with each other and stored in advance. Furthermore, in the fifth record, weather information indicating a name "low atmospheric temperature" and condition information indicating the condition "low temperature" are associated with each other and stored in advance. Although, in the present embodiment, the weather "low atmospheric temperature" means weather in which atmospheric temperature is lower than a predetermined temperature, such as 10° C., the predetermined temperature is not limited thereto.

Further, the information storage 590 of the information processing device 500 stores, in advance, a performance table, as illustrated in FIG. 11, in which information about vehicle performance of the vehicles 800 and 900 is stored in advance. A plurality of records is stored in the performance table in advance, and, in each record, a vehicle ID "800" or "900" identifying the vehicle 800 or 900 and performance information indicating vehicle performance that the vehicle 800 or 900 has are associated with each other and stored in advance.

In the present embodiment, the vehicle performance of the vehicles 800 and 900 includes protection performance to protect articles respectively stored in the bodies of the vehicles 800 and 900 from conditions generated by weather. In the present embodiment, the protection performance includes wind-resistant performance to suppress shaking of an article, waterproof performance to suppress water wetting of an article, and heat retention performance to suppress temperature reduction of an article.

In the present embodiment, the vehicle 800, although not having the wind-resistant performance, has the waterproof performance and the heat retention performance. Thus, in the first record in the performance table, the vehicle ID "800" identifying the vehicle 800 and performance information including a flag indicating that the vehicle 800 does not have the wind-resistant performance, a flag indicating that the vehicle 800 has the waterproof performance, and a flag indicating that the vehicle 800 has the heat retention performance are associated with each other and stored in advance.

In addition, in the present embodiment, the vehicle 900, although having the wind-resistant performance, has neither the waterproof performance nor the heat retention performance. Thus, in the second record in the performance table, the vehicle ID "900" identifying the vehicle 900 and performance information including a flag indicating that the vehicle 900 has the wind-resistant performance, a flag indicating that the vehicle 900 does not have the waterproof performance, and a flag indicating that the vehicle 900 does not have the heat retention performance are associated with each other and stored in advance.

The information storage 590 of the information processing device 500 also stores, in advance, a condition table, as illustrated in FIG. 12, in which information about conditions from which an article is protected by vehicle performance is stored in advance. A plurality of records is stored in the condition table in advance, and, in each record, performance information indicating vehicle performance and condition information indicating a condition from which an article is protected by the vehicle performance are associated with each other in advance and stored.

In the present embodiment, the following description will be made using, as a specific example, a case where, since the wind-resistant performance suppresses shaking of an article, in the first record in the condition table, performance information indicating "wind-resistant performance" and condition information indicating the condition in which "shaking" occurs on an article are associated with each other in advance and stored. In addition, in the second record, performance information indicating "waterproof performance" and condition information indicating the condition in which "wetting" occurs on an article are associated with each other in advance and stored. Further, in the third record, performance information indicating "heat retention performance" and condition information indicating the condition "low temperature" are associated with each other in advance and stored.

In addition, the information storage 590 of the information processing device 500 stores, in advance, a schedule table, as illustrated in FIG. 13, in which information about schedules of the vehicles 800 and 900 is stored in advance. In the schedule table, a plurality of records is stored in advance, and, in each record, information indicating a period of time and the vehicle ID "800" or "900" identifying the vehicle 800 or 900 that, when an order specifying the period of time is accepted, is scheduled to transport the ordered article are associated with each other in advance and stored.

In the present embodiment, in order to simplify description, description will be made assuming that, with respect to one period of time, one order targeting one article is accepted and the vehicle 800 or 900 transports the one article. Thus, the vehicle ID of one of the vehicles 800 and 900 and one article ID are associated with information indicating one period of time.

In the present embodiment, in the first record in the schedule table, information indicating a period of time "from 09:00 to 09:30" and the vehicle ID "800" of the vehicle 800 are associated with each other in advance and stored. The reason why such pieces of information are associated with each other is that, when an order specifying the period of time "from 09:00 to 09:30" is accepted, the vehicle 800 is scheduled to transport the ordered article.

In addition, in each record, characters "NULL" are associated with information indicating a period of time in advance and stored. When an order is accepted through execution of the order acceptance processing illustrated in FIG. 7, the characters "NULL" are updated with the article ID of an article targeted by the order.

In addition, the information storage 590 of the information processing device 500 stores, in advance, a not-illustrated user table in which information about users who are orderers is stored in advance. A plurality of records is stored in the user table in advance, and, in each record, a user ID identifying a user and information indicating a password that the user has set in advance are associated with each other and stored in advance.

When the execution of the order acceptance processing is started, the acquirer 510 of the information processing device 500 acquires, from the data communication circuit 504*a*, an authentication request that has been received from the terminal device 100 and acquires authentication information included in the authentication request (step S11).

Next, the authenticator 520 of the information processing device 500 acquires, from the not-illustrated user table, information indicating a password associated with a user ID included in the authentication information. Subsequently, when the password acquired from the user table and the password included in the authentication information do not coincide with each other, the authenticator 520 determines that the user authentication has failed (step S12; No). Subsequently, the authenticator 520 terminates the execution of the order acceptance processing.

In contrast, when the two passwords coincide with each other, the authenticator 520 of the information processing device 500 determines that the user authentication has succeeded (step S12; Yes). Next, the outputter 560 of the information processing device 500 outputs information indicating an authentication result that the user authentication has succeeded to the data communication circuit 504*a* with the terminal device 100 as the destination (step S13).

Subsequently, the acquirer 510 of the information processing device 500 acquires one or a plurality of records in which the characters "NULL" are stored from the schedule table in FIG. 13 in order to identify a specifiable period of time, which is a period of time that the orderer can specify. The reason why such records are acquired is that, since the characters "NULL" indicate that there exists no article the order of which has been accepted, the orderer can specify a period of time that is indicated by information of a record in which the characters "NULL" are stored.

Next, the acquirer 510 of the information processing device 500 acquires, for example, a system time that is managed by the operating system (OS). Next, the acquirer 510 acquires one or a plurality of specifiable periods of time by acquiring one or a plurality of periods of time the start times of which are later than the system time by a predetermined period out of one or a plurality of periods of time indicated by information stored in the acquired one or plurality of records. In the present embodiment, the predetermined period is set, in advance, to an average time required after the user authentication has been performed until an order request requesting acceptance of an order from the terminal device 100 is received. A person skilled in the art can determine, by experiment, a suitable value for the predetermined period.

Subsequently, the outputter 560 of the information processing device 500 outputs one or a plurality of pieces of information that respectively indicates the acquired one or plurality of specifiable periods of time to the data communication circuit 504*a* with the terminal device 100 that the orderer operates as the destination (step S14).

Subsequently, when the data communication circuit 504*a* of the information processing device 500 receives information indicating a specified period of time specified by the orderer, the acquirer 510 acquires the information from the data communication circuit 504*a* (step S15).

In the present embodiment, in order to simplify description, the following description will be made using, as a specific example, a case where the orderer specifies the period of time "from 09:00 to 09:30."

Figure 14:
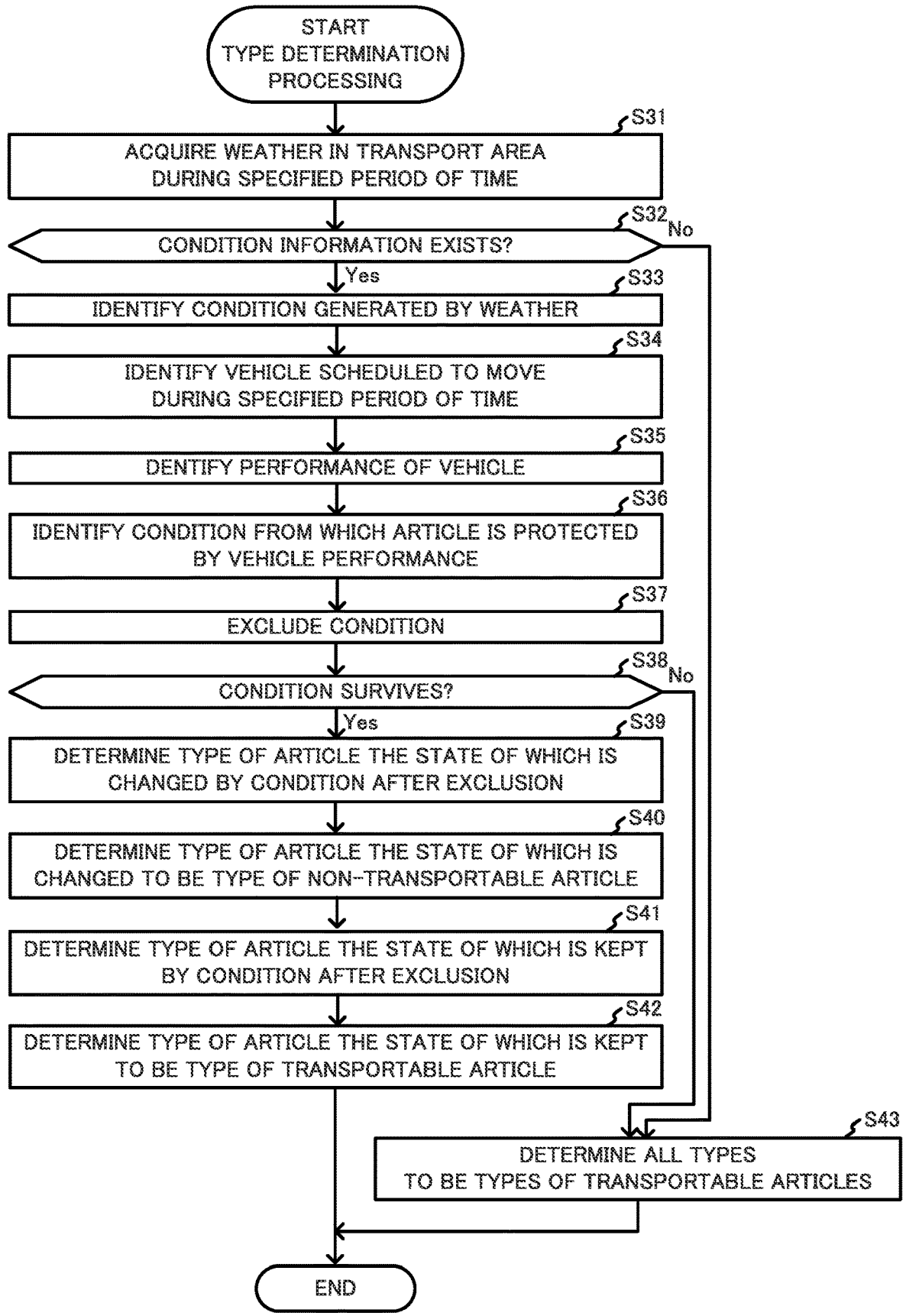
FIG. 14 is a flowchart illustrating an example of type determination processing that the information processing device executes.

After information indicating the specified period of time has been acquired in step S15, type determination processing, as illustrated in FIG. 14, of determining the type of an article that is transportable by the vehicle 800 or 900 during the specified period of time is executed (step S16).

When the execution of the type determination processing is started, the acquirer 510 of the information processing device 500 acquires weather information indicating "strong wind" and weather information indicating "rain" that are associated with information indicating the specified period of time "from 09:00 to 09:30" in the forecast table in FIG. 6 (step S31). Next, the determiner 540 determines that there exists condition information associated with the weather information indicating "strong wind" or the weather information indicating "rain" in the weather table in FIG. 10 (step S32; Yes). Thus, the determiner 540 determines that a condition in which weather having the name "rain with strong wind" causes a deliverable state of an article to be changed is generated.

Subsequently, the determiner 540 acquires condition information associated with the weather information indicating "strong wind" and condition information associated with the weather information indicating "rain." Through this processing, the determiner 540 identifies that the weather having the name "rain with strong wind" causes a condition in which "shaking" occurs and a condition in which "wetting" occurs to be generated on an article to be transported in the transport area during the period of time "from 09:00 to 09:30" (step S33).

Subsequently, the identifier 530 of the information processing device 500 acquires the vehicle ID "800" associated with information indicating the specified period of time "from 09:00 to 09:30" from the schedule table in FIG. 13. Through this processing, the identifier 530 identifies the vehicle 800 out of the vehicle 800 and the vehicle 900, which have vehicle performances different from each other, as a vehicle scheduled to move in the transport area to transport an article during the specified period of time "from 09:00 to 09:30" (step S34).

Next, the determiner 540 of the information processing device 500 acquires performance information associated with the vehicle ID "800" of the vehicle 800 from the performance table in FIG. 11 and acquires a flag indicating that the vehicle 800 does not have the wind-resistant performance, a flag indicating that the vehicle 800 has the waterproof performance, and a flag indicating that the vehicle 800 has the heat retention performance from the performance information. Through this processing, the determiner 540 identifies that the vehicle 800 has the waterproof performance and the heat retention performance (step S35).

Subsequently, the determiner 540 of the information processing device 500 acquires (i) condition information indicating the condition in which "wetting" occurs that is associated with the information indicating the waterproof performance and (ii) condition information indicating the condition "low temperature" that is associated with the information indicating the heat retention performance, from the condition table in FIG. 12. Through this processing, the determiner 540 identifies that conditions from which an article is protected by the vehicle performance of the vehicle 800 are the condition in which "wetting" occurs and the condition "low temperature" (step S36).

Next, the determiner 540 of the information processing device 500 excludes the condition information acquired in step S36 from the condition information acquired in step S33 (step S37). Subsequently, the determiner 540 determines that the condition information indicating the condition in which "shaking" occurs survives (step S38; Yes).

Thus, the determiner 540 determines that, although the condition in which "wetting" occurs is generated by weather having the name "rain with strong wind", wetting of an article stored in and transported by the vehicle 800 is suppressed because the vehicle 800 has the waterproof performance. The determiner 540 also determines that the condition in which "shaking" occurs is generated by the weather "rain with strong wind" and shaking of an article stored in and transported by the vehicle 800 is not suppressed because the vehicle 800 does not have the wind-resistant performance.

Subsequently, the determiner 540 of the information processing device 500 acquires type information indicating "precision equipment" that is associated with information indicating the condition in which "shaking" occurs, which is condition information after exclusion, in the type table in FIG. 9. Through this processing, the determiner 540 determines "precision equipment" to be the type of an article the state of which is not kept in the deliverable state and is changed to the undeliverable state during transport by the vehicle 800 by the conditions in which "shaking" occurs that is generated by the weather "rain with strong wind", which is forecasted weather during the specified period of time "from 09:00 to 09:30" (step S39).

Subsequently, the determiner 540 of the information processing device 500 determines the type "precision equipment" identified in step S39 to be the type of an article that is not transportable by the vehicle 800 in the transport area during the specified period of time "from 09:00 to 09:30" (step S40). The determiner 540 also acquires, in the article table in FIG. 8, the article IDs "G11" and "G12" that are associated with the type information indicating the type "precision equipment" and determines the article "clock" and the article "personal computer" that are respectively identified by the acquired article IDs, to be articles that are non-transportable by the vehicle 800 in the transport area during the specified period of time.

In contrast, the determiner 540 of the information processing device 500 acquires a plurality of pieces of type information that is different from the type information indicating the type "precision equipment" identified in step S39, out of a plurality of pieces of type information stored in the article table in FIG. 8. Next, the determiner 540 determines a plurality of types "clothes", "hot drink", and "snack" that are respectively indicated by the acquired plurality of pieces of type information, to be the types of articles the states of which are not changed, but kept in the deliverable state during transport by the vehicle 800 by conditions generated by weather forecasted in the transport area during the specified period of time (step S41). Next, the determiner 540 determines the determined types "clothes", "hot drink", and "snack" to be the types of articles that are transportable by the vehicle 800 in the transport area during the specified period of time "from 09:00 to 09:30" (step S42).

In addition, the determiner 540 of the information processing device 500 acquires the article IDs "G21", "G31", and "G41" that are associated with the type information indicating the types "clothes", "hot drink", and "snack", respectively, in the article table in FIG. 8. Next, the determiner 540 determines articles "shirt", "canned coffee", and "potato chips" that are respectively identified by the acquired article IDs, to be articles that are transportable by the vehicle 800 in the transport area during the specified period of time, and the information processing device 500 subsequently terminates the execution of the type determination processing.

After the type determination processing has been executed in step S16 in FIG. 7, the acceptor 550 of the information processing device 500 acquires an article ID and information indicating the name of an article identified by the article ID, from each of the plurality of records stored in the article table in FIG. 8. Next, the acceptor 550 generates a list that includes a plurality of the acquired article IDs and the names of articles, and outputs information indicating the generated list to the data communication circuit 504a with the terminal device 100 as the destination (step S17).

When, after having sent the information indicating the list to the terminal device 100, the data communication circuit 504a of the information processing device 500 receives an order request, the acquirer 510 acquires the order request from the data communication circuit 504a (step S18).

In the present embodiment, in order to simplify description, the following description will be made using, as a specific example, a case where an order request including the article ID "G11" identifying the article "clock" is acquired.

After the order request has been acquired in step S18, the acquirer 510 of the information processing device 500 acquires the article ID "G11" and information indicating the specified period of time "from 09:00 to 09:30" that are included in the order request. Next, the acceptor 550 determines whether or not the article ID "G11" acquired from the order request coincides with any one of the article IDs "G21", "G31", and "G41" of articles that are transportable during the specified period of time "from 09:00 to 09:30." On this occasion, since the article ID "G11" acquired from the order request does not coincide with any of the article IDs "G21", "G31", and "G41" of the transportable articles, the acceptor 550 determines that the article "clock" that is targeted by the order is not an article transportable during the specified period of time "from 09:00 to 09:30" (step S19; No). Next, the acceptor 550 restricts acceptance of the order the acceptance of which is requested by the order request (step S20).

Subsequently, the outputter 560 of the information processing device 500 outputs a restriction notification notifying that acceptance of the order is restricted to the data communication circuit 504a with the terminal device 100 as the destination. Subsequently, in order to acquire an order request again, the above-described processing is repeated from step S18.

In the present embodiment, the following description will be made using, as a specific example, a case where an order request is acquired again and the article ID "G21" identifying the article "shirt" is included in the order request that is acquired again.

When the data communication circuit 504a of the information processing device 500 receives an order request again, the acquirer 510 acquires the order request from the data communication circuit 504a again (step S18) and acquires the article ID "G21" from the order request that is acquired again.

Next, since the article ID "G21" acquired from the order request coincides with the article ID "G21" of a transportable article, the acceptor 550 of the information processing device 500 determines that the article "shirt" that is targeted by the order is an article transportable in the transport area during the specified period of time "from 09:00 to 09:30" (step S19; Yes). Next, the acceptor 550 stores the article ID "G21" acquired from the order request in a record in which information indicating the specified period of time "from 09:00 to 09:30" is stored among the plurality of records stored in the schedule table in FIG. 13. Through this processing, the acceptor 550 accepts the order the acceptance of which is requested (step S21).

Subsequently, the outputter 560 of the information processing device 500 outputs an acceptance notification notifying that the order has been accepted to the data communication circuit 504a with the terminal device 100 as the destination, and the information processing device 500 subsequently terminates the execution of the order acceptance processing.

After the execution of the order acceptance processing has been terminated, the CPU 501 of the information processing device 500 executes not-illustrated transport control processing of controlling the vehicle 800 or 900 to transport an article at a predetermined cycle, such as once every minute.

When the execution of the transport control processing is started, the controller 570 of the information processing device 500 acquires one or a plurality of records in which the article IDs of articles the orders of which have been accepted are stored, from the schedule table in FIG. 13 and acquires information indicating the earliest period of time out of information indicating periods of time that are respectively stored in the acquired one or plurality of records. Subsequently, the controller 570 acquires a system time from the OS, and determines whether or not the start time of the earliest specified period of time is a time later than the system time. On this occasion, when the controller 570 determines that the start time of the earliest specified period of time is a time later than the system time, the controller 570 determines that the earliest specified period of time has not arrived and terminates the execution of the transport control processing.

In contrast, when the controller 570 of the information processing device 500 determines that the start time of the earliest specified period of time is the same time as the system time or that the start time is a time earlier than the system time, the controller 570 determines that the earliest specified period of time has arrived.

Next, the controller 570 of the information processing device 500 acquires the vehicle ID and the article ID associated with information indicating the earliest specified period of time in the schedule table in FIG. 13. Subsequently, the controller 570 causes the display device 505b to display a message that includes the acquired vehicle ID and article ID and prompts storage of an article identified by the article ID in the vehicle 800 or 900 identified by the vehicle ID.

When an employee of the office visually recognizes the display, the employee moves to a warehouse of the office, and searches for an article identified by the visually recognized article ID. Subsequently, the employee stores the found article into the vehicle 800 or 900 identified by the visually recognized vehicle ID and subsequently operates the input device 505c of the information processing device 500. Note that searching for an article and storing the article into the vehicle 800 or 900 may be performed without or with little human intervention by, for example, a self-propelled robot that moves a shelf specified by the information processing device 500 out of a plurality of shelves on which articles are stored to a vicinity of the vehicle 800 or 900 and a robot arm that picks up the article from the moved shelf and causes the vehicle 800 or 900 to store the article thereinto.

When the input device 505c of the information processing device 500 outputs a signal corresponding to an operation by the employee, the controller 570 of the information processing device 500 acquires information indicating a transport route that the information storage 590 stores in advance. The information indicating a transport route includes information indicating locations in latitude, longitude, and altitude of one or a plurality of nodes included in the transport route and information indicating a visiting sequence of the one or plurality of nodes.

Next, the controller 570 of the information processing device 500 outputs a transport command that includes the acquired information indicating the transport route and commands transport of the ordered article to the transport destination by a flight on the transport route, to the data communication circuit 504a with the vehicle 800 or 900 identified by the acquired vehicle ID as the destination.

After the data communication circuit 504a of the information processing device 500 has sent the transport command to the vehicle 800 or 900, the controller 570 updates the article ID associated with the information indicating the earliest specified period of time with the characters "NULL", in the schedule table in FIG. 13 and subsequently terminates the execution of the transport control processing.

Figure 15:
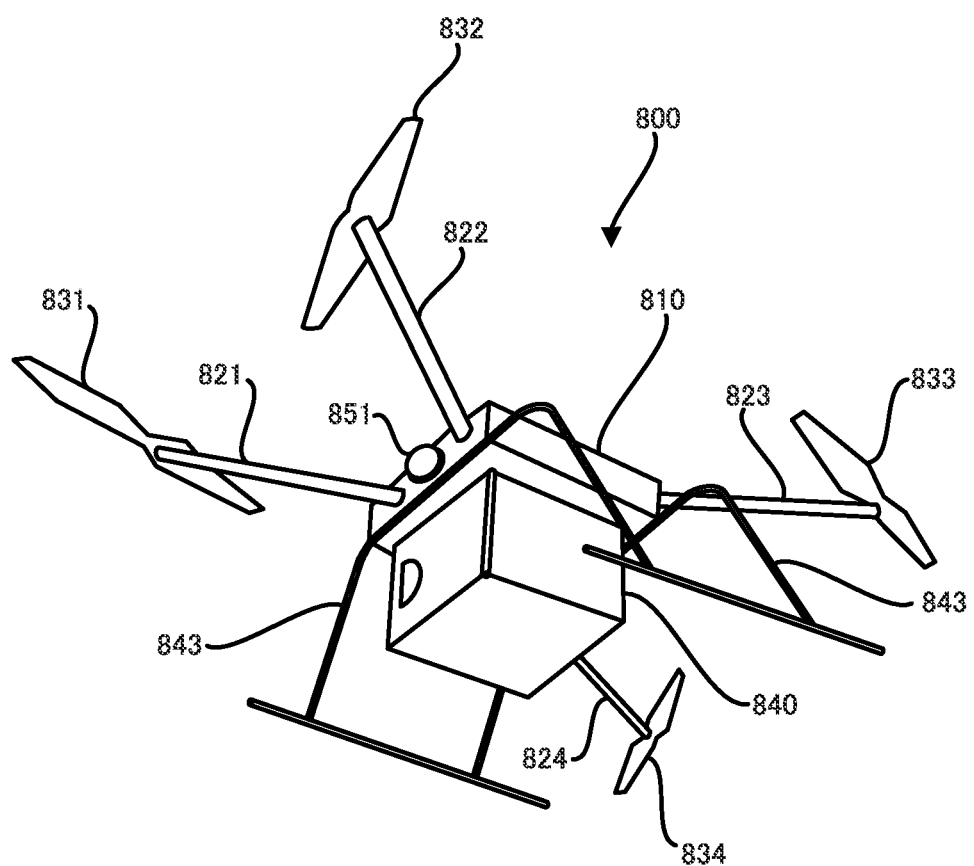
FIG. 15 is an appearance configuration diagram illustrating an example of an appearance of a vehicle according to Embodiment 1.

The vehicle 800, which receives the transport command from the information processing device 500, is, for example, an unmanned aircraft, such as a drone, and has landed at the office. The vehicle 800 includes a control device 810 that has a rectangular parallelepiped shape as illustrated in FIG. 15 and controls the attitude and the flight of the vehicle 800. In the present embodiment, a surface serving as a reference surface among a plurality of surfaces that the control device 810 of the vehicle 800 has is referred to as a front surface, and a direction parallel with the normal direction of the front surface and pointing to the outside of the control device 810 is referred to as a front direction of the vehicle 800. In addition, one of surfaces that are perpendicular to the front surface among the plurality of surfaces that the control device 810 has is referred to as an upper surface, and a direction parallel with the normal direction of the upper surface and pointing to the outside of the control device 810 is referred to as an upper direction of the vehicle 800.

The vehicle 800 includes propeller arms 821 and 822 and propeller arms 823 and 824 that protrude right forward and left forward from the front face of the control device 810 and left rearward and right rearward from the back surface of the control device 810, respectively. Further, the vehicle 800 includes propellers 831 to 834 that are installed on the tips of the propeller arms 821 to 824, respectively and not-illustrated motors that rotate the propellers 831 to 834 in accordance with control by the control device 810.

Distance between propellers of the vehicle 800 is equal to or less than a predetermined distance, size of the vehicle 800 is equal to or less than a predetermined size, and mass of the vehicle 800 is equal to or less than a predetermined mass. Generally, shaking that occurs on a vehicle when the vehicle flies increases as the size decreases, the mass decreases, and the distance between propellers decreases. Thus, when the vehicle 800 flies in airspace in which a wind having a speed faster than a predetermined wind speed blows, a large shaking to the extent that the state of an article the type of which is "precision equipment" changes from the deliverable state to the undeliverable state occurs on the vehicle 800. Thus, the vehicle 800 does not have the wind-resistant performance that enables shaking of an article to be suppressed.

On the under surface of the control device 810 of the vehicle 800, a storage cabinet 840 for storing an article is installed. The storage cabinet 840 includes a not-illustrated box body that is closed by a back plate, a bottom plate, a ceiling plate, and two side plates, which are not illustrated, and forms a space the front of which is opened. The box body includes, on the opening thereof, a door, a not-illustrated door frame that receives the door, a not-illustrated deadbolt that is a bolt installed on the back surface of the door, and a not-illustrated strike that is a strike plate for the deadbolt and that is installed on the door frame.

The storage cabinet 840 of the vehicle 800 further includes a not-illustrated motor that is driven in accordance with a signal output by the control device 810 connected by a not-illustrated cable. The motor, driven by the control device 810, locks the door by inserting the deadbolt into the strike and unlocks the door by pulling out the deadbolt out of the strike.

Gaps between the back plate and the bottom plate, the ceiling plate, and the two side plates and gaps between the two side plates and the bottom plate and the ceiling plate of the box body of the vehicle 800 are filled with, for example, silicon caulking. On the back surface of the door, packing that is made of, for example, rubber and that, with the door closed, is sandwiched between the door and the door frame and fills the gap between the door and the door frame is installed. Because of this configuration, when the door is closed, the storage cabinet 840 is capable of preventing water from infiltrating into the inside of the storage cabinet 840. Thus, the body of the vehicle 800 has the waterproof performance that enables wetting of an article stored in the storage cabinet 840 to be suppressed.

The storage cabinet 840 of the vehicle 800 also includes a not-illustrated integrated circuit (IC) temperature sensor that measures temperature inside the storage cabinet 840 and outputs a signal representing measurement temperature, which is measured temperature. The storage cabinet 840 also includes a not-illustrated heater, which is, for example, a electrical heating wire, and a not-illustrated switch that, when measurement temperature represented by a signal output from the IC temperature sensor is a temperature within a preset range, opens a circuit to which the heater is connected and suspends heat generation by the heater. When the measurement temperature is not a temperature within the preset range, the switch closes the circuit and causes the heater to generate heat. Thus, the storage cabinet 840 is capable of preventing the temperature inside the storage cabinet 840 from decreasing to a temperature lower than the lower limit of a predetermined temperature range, such as 55° C. Thus, the body of the vehicle 800 has the heat retention performance that enables temperature reduction of an article stored in the storage cabinet 840 to be suppressed.

The vehicle 800 further includes support legs 843 that protrude downward from the under surface of the control device 810 and that support the control device 810. Length in the vertical direction of the support legs 843 is designed to be longer, by a predetermined length, than length in the vertical direction of the storage cabinet 840. The purpose of the support legs 843 being designed in this manner is to prevent the storage cabinet 840 from colliding with the ground or the floor of a landing point when the vehicle 800 lands.

Furthermore, the vehicle 800 includes a light detection and ranging (LiDAR) sensor 851 that is installed on the front surface of the control device 810 and a not-illustrated LiDAR sensor that is installed on the back surface of the control device 810.

The LiDAR sensor 851 on the front surface emits laser light in a plurality of directions that are included in a range of azimuth angle formed with the reference azimuthal direction from −90 degrees to +90 degrees and elevation angle formed with the front direction of the vehicle 800 from −90 degrees to +90 degrees, when it is assumed that the vehicle 800 flies in such a way that the under surface of the control device 810, which the vehicle 800 includes, is parallel with a horizontal plane and the front direction of the vehicle 800 is the reference azimuthal direction. The LiDAR sensor 851 on the front surface receives reflected light of the emitted laser light and, based on a time from the emission of the laser light to the reception of the reflected light, measures distances to a plurality of reflection points at which the laser light is reflected. Next, the LiDAR sensor 851 on the front surface calculates coordinate values of the plurality of reflection points in a three-dimensional coordinate system of the vehicle 800 with the center point of the vehicle 800 taken as the origin, based on the emission directions of the laser light and the measured distances. Subsequently, the LiDAR sensor 851 on the front surface outputs the calculated coordinate values of the plurality of reflection points to the control device 810.

The LiDAR sensor on the back surface emits infrared laser light in a plurality of directions that are included in a range of azimuth angle formed with the reference azimuthal direction from −90 degrees to +90 degrees and elevation angle formed with the rearward direction of the vehicle 800 from −90 degrees to +90 degrees, when it is assumed that the vehicle 800 flies in such a way that the under surface of the control device 810 is parallel with a horizontal plane and the rearward direction of the vehicle 800 is the reference azimuthal direction. In addition, the LiDAR sensor on the back surface calculates coordinate values of a plurality of reflection points of the emitted laser light in the three-dimensional coordinate system of the vehicle 800 and outputs the calculated coordinate values of the plurality of reflection points to the control device 810.

The reason why the LiDAR sensor 851 on the front surface and the LiDAR sensor on the back surface output the coordinate values of a plurality of reflection points to the control device 810 is that, in order to fly avoiding objects, such as an obstacle, the control device 810 identifies the coordinate values in the three-dimensional space and sizes of objects existing in all directions with the vehicle 800 used as a reference.

Figure 16:
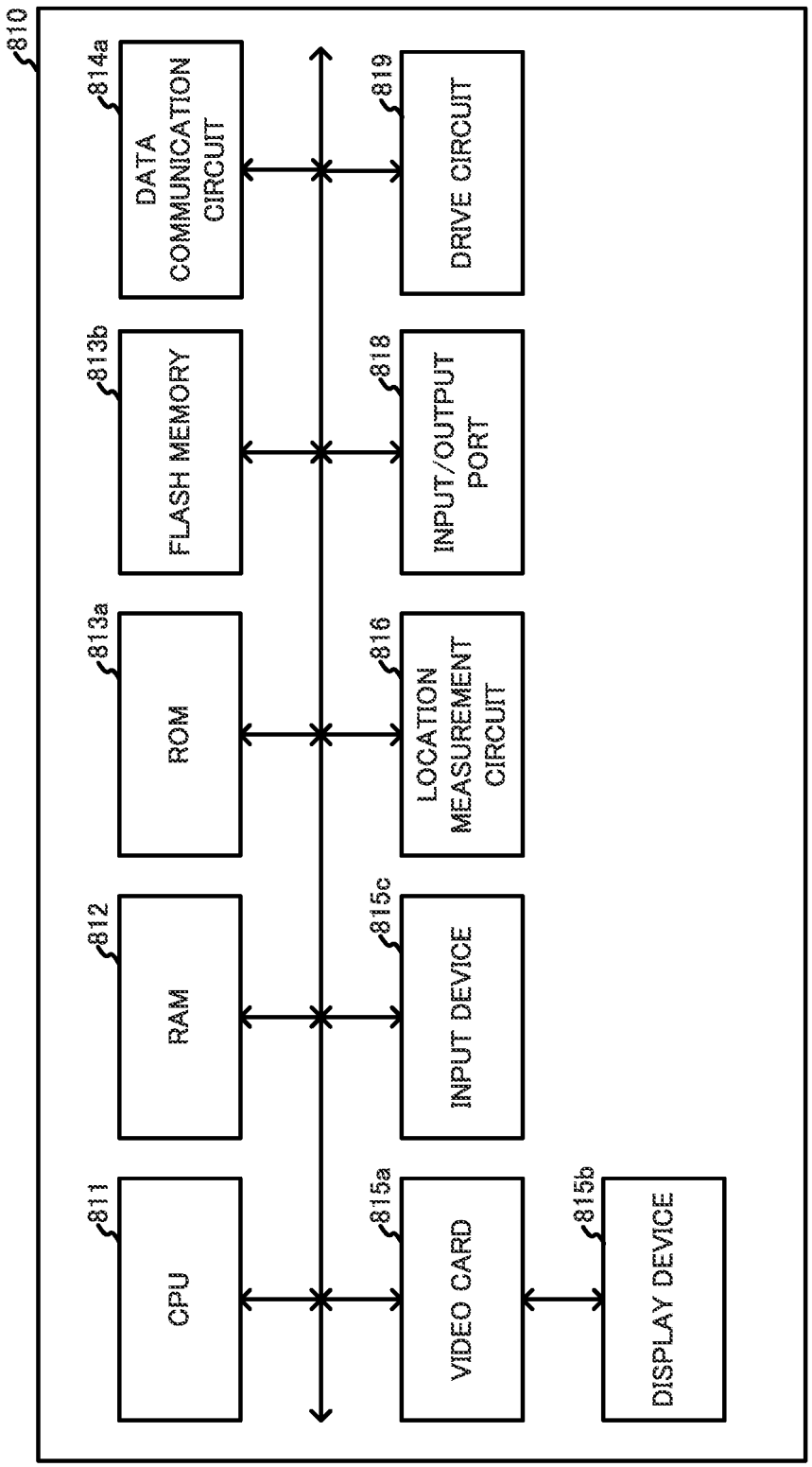
FIG. 16 is a hardware configuration diagram illustrating a configuration example of a control device that the vehicle includes.

The control device 810 of the vehicle 800 includes a CPU 811, a RAM 812, a ROM 813*a*, a flash memory 813*b*, a data communication circuit 814*a*, a video card 815*a*, a display device 815*b*, an input device 815*c*, a location measurement circuit 816, an input/output port 818, and a drive circuit 819, as illustrated in FIG. 16. Although, in the present embodiment, description will be made assuming that the control device 810 includes one CPU 811, the present embodiment is not limited thereto, and the control device 810 may include a plurality of CPUs. In addition, the control device 810 may include a plurality of RAMs and may include a plurality of flash memories.

Configurations and functions of the CPU 811, the RAM 812, the ROM 813*a*, the flash memory 813*b*, the data communication circuit 814*a*, the video card 815*a*, the display device 815*b*, the input device 815*c*, and the location measurement circuit 816 of the vehicle 800 are the same as the configurations and functions of the CPU 101, the RAM 102, the ROM 103*a*, the flash memory 103*b*, the data communication circuit 104*a*, the video card 105*a*, the display device 105*b*, input device 105*c*, and the location measurement circuit 106 of the terminal device 100 illustrated in FIG. 2, respectively.

The input/output port 818 of the vehicle 800 is connected to not-illustrated cables that are respectively connected to the LiDAR sensor 851 on the front surface and the LiDAR sensor on the back surface. The input/output port 818 inputs signals representing coordinate values that the LiDAR sensor 851 on the front surface and the LiDAR sensor on the back surface respectively output, to the CPU 811.

The drive circuit 819 is connected to not-illustrated cables that are respectively connected to the not-illustrated motors that rotate the propellers 831 to 834 illustrated in FIG. 15. The drive circuit 819 drives, in accordance with the signals output by the CPU 811, the not-illustrated motors that rotate the propellers 831 to 834.

Figure 17:
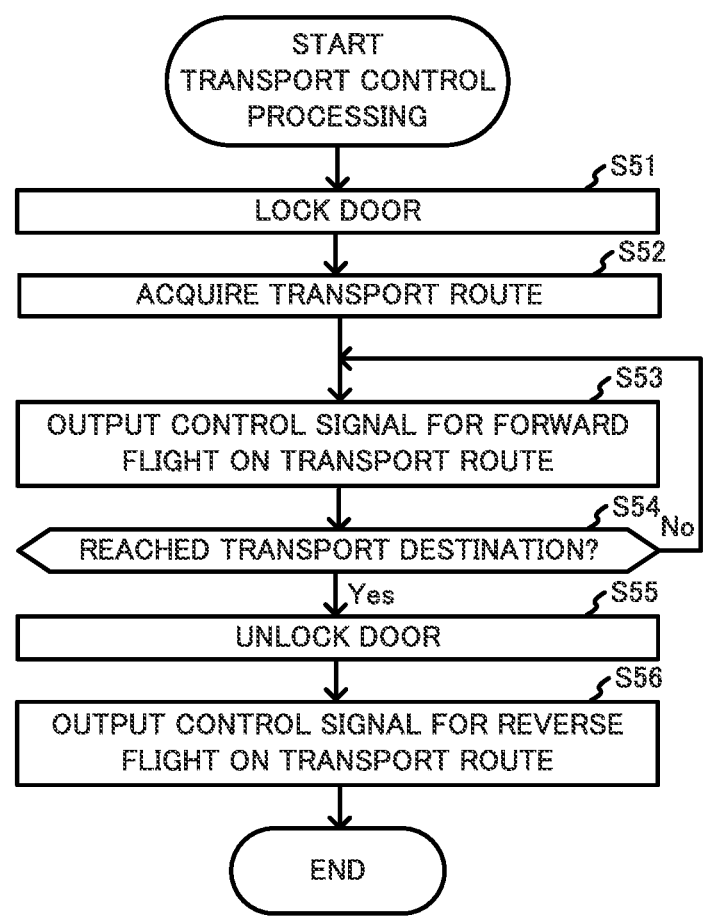
FIG. 17 is a flowchart illustrating an example of transport control processing that the vehicle executes.

When the data communication circuit 814*a* of the vehicle 800 receives a transport command sent from the information processing device 500, the CPU 811 of the vehicle 800 executes transport control processing, as illustrated in FIG. 17, that causes the vehicle 800 to transport an article in accordance with the transport command.

When starting the execution of the transport control processing, the CPU 811 of the vehicle 800, by outputting a signal causing the deadbolt to be inserted into the strike to the drive circuit 819, locks the door of the storage cabinet 840 (step S51).

Next, the CPU 811 of the vehicle 800 acquires the transport command from the data communication circuit 814*a* and acquires information indicating a transport route from the acquired transport command (step S52).

Next, the CPU 811 of the vehicle 800 acquires information indicating the location of the vehicle 800 in latitude, longitude, and altitude, based on a signal output from the location measurement circuit 816. Next, the CPU 811, based on the information indicating the location of the vehicle 800 in latitude, longitude, and altitude and information indicating, in latitude, longitude, and altitude, the location of a first node in the visiting sequence among one or a plurality of unvisited nodes included in the transport route, generates a control signal for making a flight that causes distance from the vehicle 800 to the first unvisited node in the visiting sequence to be reduced. Subsequently, the CPU 811, by outputting the generated control signal to the drive circuit 819 (step S53), causes the vehicle 800 to fly the transport route in the forward direction.

Subsequently, when the CPU 811 of the vehicle 800 determines that, since the vehicle 800 has not visited all of the one or plurality of nodes included in the transport route, the vehicle 800 has not reached the transport destination (step S54; No), the CPU 811 repeats the above-described processing from step S53. In contrast, when the CPU 811 determines that, since the vehicle 800 has visited all of the one or plurality of nodes included in the transport route, the vehicle 800 has reached the transport destination (step S54; Yes), the CPU 811 outputs a control signal for landing to the drive circuit 819. Subsequently, the CPU 811, by outputting a signal causing the deadbolt to be pulled out from the strike to the drive circuit 819, unlocks the door of the storage cabinet 840 (step S55).

Subsequently, the orderer who is present at the transport destination takes out the article from the storage cabinet 840 of the vehicle 800 and subsequently operates the input device 815*c* of the vehicle 800. When the input device 815*c* outputs a signal corresponding to an operation of the orderer, the CPU 811 outputs, to the drive circuit 819, a control signal that causes the vehicle 800 to fly the transport route in the reverse direction to the office (step S56), and subsequently terminates the execution of the transport control processing. Through this processing, the vehicle 800 that has finished transport of the article returns to the office.

Figure 18:
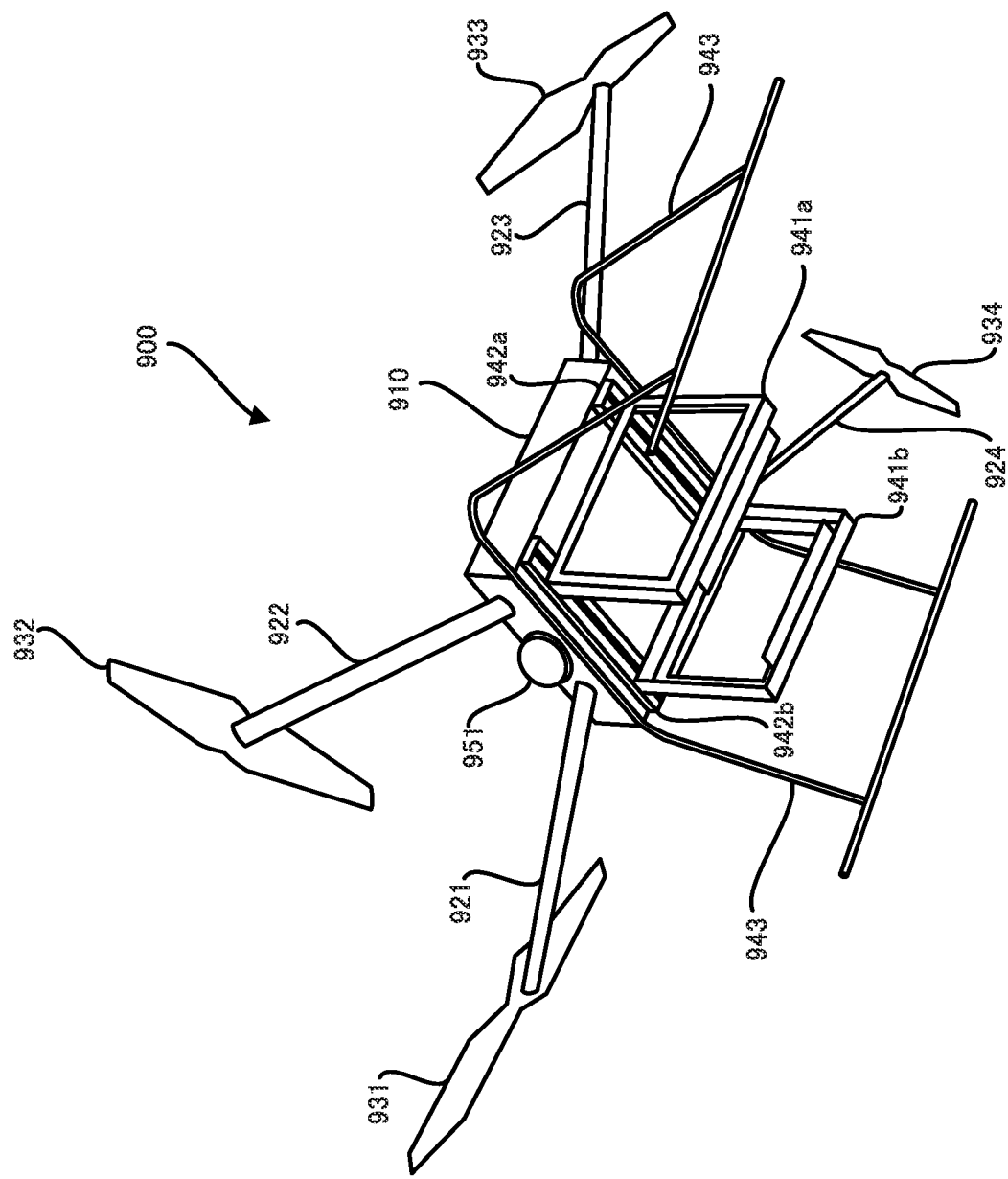
FIG. 18 is an appearance configuration diagram illustrating another example of the appearance of the vehicle according to Embodiment 1.

The vehicle 900, as with the vehicle 800, is an unmanned aircraft, such as a drone, and includes a control device 910 that has a rectangular parallelepiped shape as illustrated in FIG. 18. The vehicle 900 includes propeller arms 921 to 924, propellers 931 to 934, and not-illustrated motors that rotate the propellers 931 to 934. Configurations and functions of the propeller arms 921 to 924, the propellers 931 to 934, and the motors are the same as the configurations and functions of the propeller arms 821 to 824, the propellers 831 to 834, and the not-illustrated motors that rotate the propellers 831 to 834 of the vehicle 800.

Distance between propellers of the vehicle 900 is longer than the predetermined distance, size of the vehicle 900 is larger than the predetermined size, and mass of the vehicle 900 is greater than the predetermined mass. Thus, even when the vehicle 900 flies in airspace in which a wind blows at a speed faster than a predetermined wind speed and slower than a maximum wind speed that has ever been observed in the transport area in the past, no shaking occurs on the vehicle 900 or only a small shaking occurs on the vehicle 900 to the extent that the state of an article the type of which is "precision equipment" is kept in the deliverable state. Thus, the vehicle 900 has the wind-resistant performance, differing from the vehicle 800.

The vehicle 900 differs from the vehicle 800 in including, instead of a storage cabinet for storing an article, a first holding frame 941*a* and a second holding frame 941*b* that surround and hold an article beneath the control device 910.

The first holding frame 941*a* of the vehicle 900 surrounds and holds the four sides of one (hereinafter, referred to as a first surrounded face) of the side faces of a rectangular parallelepiped shaped cardboard in which an article is packaged, and the second holding frame 941*b* surrounds and holds the four sides of another side face (hereinafter, referred to as a second surrounded face) opposite to the first surrounded face surrounded and held by the first holding frame 941*a*.

In addition, the vehicle 900 includes, on the under surface of the control device 910, guide rails 942*a* and 942*b* that extend in the normal direction of the first surrounded face and the second surrounded face of the article, suspend the first holding frame 941*a* and the second holding frame 941*b*, and allow the movement direction of the first holding frame 941 and the second holding frame 941*b* to be the extending direction of the guide rails 942*a* and 942*b*.

Further, the vehicle 900 includes a not-illustrated motor that causes the first holding frame 941*a* and the second holding frame 941*b* to surround and hold an article by moving, in accordance with control by the control device 910, the first holding frame 941*a* and the second holding frame 941*b* in directions in which the first holding frame 941*a* and the second holding frame 941*b* come close to each other. The not-illustrated motor causes the first holding frame 941*a* and the second holding frame 941*b* to release a surrounded and held article by moving, in accordance with control by the control device 910, the first holding frame 941*a* and the second holding frame 941*b* in directions in which the first holding frame 941*a* and the second holding frame 941*b* move away from each other.

Since the vehicle 900 surrounds and holds an article, using the first holding frame 941*a* and the second holding frame 941*b*, it is difficult to prevent an article from getting wet by, for example, rain or snow. Thus, the vehicle 900 does not have the waterproof performance, differing from the vehicle 800. In addition, since the vehicle 900 does not include a heater, differing from the vehicle 800, the vehicle 900 does not have the heat retention performance.

The control device 910 of the vehicle 900 includes a not-illustrated CPU, RAM, ROM, flash memory, data communication circuit, video card, display device, input device, location measurement circuit, input/output port, and drive circuit. Configurations and functions of the hardware components that the vehicle 900 includes are the same as the configurations and functions of the CPU 811, the RAM 812, the ROM 813*a*, the flash memory 813*b*, the data communication circuit 814*a*, the video card 815*a*, the display device 815*b*, the input device 815*c*, the location measurement circuit 816, the input/output port 818, and the drive circuit 819 of the vehicle 800.

The not-illustrated drive circuit of the vehicle 900 is connected to not-illustrated cables that are respectively connected to the not-illustrated motors that rotate the propellers 931 to 934 and a cable that is connected to the not-illustrated motor that moves the first holding frame 941*a* and the second holding frame 941*b*. The drive circuit of the vehicle 900 drives, in accordance with a signal output by the not-illustrated CPU, the not-illustrated motors that rotate the propellers 931 to 934 or the not-illustrated motor that moves the first holding frame 941*a* and the second holding frame 941*b*.

When the data communication circuit of the vehicle 900 receives a transport command sent from the information processing device 500, the CPU of the vehicle 900 executes not-illustrated transport control processing.

When starting the execution of the transport control processing, the CPU of the vehicle 900 generates a control signal causing the first holding frame 941*a* and the second holding frame 941*b* to move in the directions in which the first holding frame 941*a* and the second holding frame 941*b* come close to each other and outputs the generated signal to the drive circuit. Through this processing, the vehicle 900 surrounds and holds an article, using the first holding frame 941*a* and the second holding frame 941*b* and stores the article therein.

Subsequently, the same processing as the processing in steps S52 to S54 in FIG. 17 is executed. Through this processing, the vehicle 900 flies the transport route in the forward direction, arrives at the transport destination, and lands. Subsequently, the CPU of the vehicle 900 generates a control signal causing the first holding frame 941a and the second holding frame 941b to move in the directions in which the first holding frame 941a and the second holding frame 941b move away from each other and outputs the generated signal to the drive circuit. Through this processing, the vehicle 900 causes the first holding frame 941a and the second holding frame 941b to release the article.

Next, after the same processing as the processing in step S56 has been executed, the execution of the transport control processing is terminated. Through this processing, the vehicle 900 that has finished transport of the article returns to the office.

According to the above-described configuration, the information processing device 500 includes the acquirer 510 that acquires weather information indicating weather in a transport area in which the vehicle 800 or 900 is scheduled to move. The information processing device 500 also includes the determiner 540 that, based on the acquired weather information, determines the type of an article that is transportable by the vehicle 800 or 900 in the transport area. Because of this configuration, the information processing device 500 is capable of, based on weather, determining the type of an article that is transportable by the vehicle 800 or 900.

In addition, according to the above-described configuration, the information processing device 500 further includes the acceptor 550 that accepts an order for an article of the type determined by the determiner 540 and restricts acceptance of an order for an article of a type different from the type determined by the determiner 540. Thus, the information processing device 500 is capable of making more uniform the quantity of articles transported per period of time than a case of, after an order of an article has been accepted, waiting for the weather changing to weather that allows the ordered article to be transported and thereafter performing the transport, as a result of which transport efficiency is improved. The transport efficiency is represented by, for example, the quantity of transported articles per unit time. In addition, the information processing device 500 is capable of making shorter a period from a time when an order is accepted to a time when transport is performed than a case of waiting for the weather changing to weather allowing the transport to be performed and thereafter performing the transport. Thus, it is possible to make shorter a period from a time when an article is brought into the warehouse to a time when the article is brought out from the warehouse for transport, which enables storage efficiency in the warehouse to be improved. The storage efficiency is represented by, for example, the quantity of articles that the warehouse can store per unit time.

Further, according to the above-described configuration, the determiner 540 of the information processing device 500, based on the vehicle performance of the vehicle 800 or 900 and acquired weather information, determines the type of an article that is transportable by the vehicle 800 or 900 in the transport area. In addition, the information processing device 500 further includes the identifier 530 that identifies the vehicle 800 or 900 that is scheduled to move out of the vehicles 800 and 900, which are a plurality of vehicles the vehicle performances of which are different from each other. Further, the determiner 540 of the information processing device 500, based on the vehicle performance of the identified vehicle 800 or 900 and acquired weather information, determines the type of an article that is transportable by the vehicle 800 or 900 in the transport area. Because of this configuration, the information processing device 500 is capable of determining the type of a transportable article with better precision than a case of determining the type of a transportable article, based on only weather information.

Further, according to the above-described configuration, articles that are transportable by the vehicle 800 or 900 include an article that is kept in the deliverable state during transport by the vehicle 800 or 900. In addition, the information storage 590 of the information processing device 500 (i) stores type information indicating the type of an article and condition information indicating a condition that changes the state of the article to the undeliverable state, which is different from the deliverable state, in association with each other and (ii) stores weather information indicating weather and condition information indicating a condition generated by the weather in association with each other. Further, the determiner 540 of the information processing device 500 acquires condition information associated with the acquired weather information and acquires type information associated with the acquired condition information. Through this processing, the determiner 540 determines the type of an article the state of which is changed from the deliverable state to the undeliverable state by a condition generated by the weather in the transport area. In addition, the determiner 540 determines a type indicated by type information different from the type information acquired above among a plurality of pieces of type information stored in the information storage 590 to be the type of a transportable article. Thus, the information processing device 500 is capable of determining, to be an article having the type of a transportable article, an article the state of which is not changed from the deliverable state to the undeliverable state by the weather in the transport area and is kept in the deliverable state even when the vehicle 800 or 900 moves in the transport area. Thus, the information storage 590 is capable of suppressing the state of an article from changing from the deliverable state to the undeliverable state due to transport by the vehicle 800 or 900.

In addition, according to the above-described configuration, the vehicle 800 or 900 has vehicle performance to protect an article stored in the body of the vehicle 800 or 900 from a condition generated by weather. In addition, the information storage 590 of the information processing device 500 further stores condition information indicating a condition from which an article is protected by the vehicle performance of the vehicle 800 or 900. Further, the determiner 540 of the information processing device 500 acquires, from the information storage 590, condition information associated with acquired weather information, excludes condition information related to the vehicle 800 or 900 from the acquired condition information, and acquires type information associated with condition information after exclusion. Therefore, even in the case of the type of an article the state of which changes from the deliverable state to the undeliverable state due to a condition generated by weather in the transport area when the vehicle 800 or 900 moves in the transport area, the information processing device 500 is capable of determining even such a type to be the type of a transportable article, provided that the article is protected from the weather condition by the vehicle performance of the vehicle 800 or 900.

Further, according to the above-described configuration, the deliverable state of an article includes a state in which the article is dry, and the weather includes weather in which "rain" falls. In addition, conditions causing the deliverable state of an article to change and conditions generated by weather include a condition in which "wetting" occurs, and the vehicle performance of the vehicle 800 includes the waterproof performance to suppress wetting of an article. Therefore, even when the weather in the transport area is the weather "rain", the vehicle 800 with the waterproof performance moving in the transport area with the article stored therein enable the article to be prevented from getting wet due to the weather in which "rain" falls. Thus, the information processing device 500 is capable of determining, to be the type of an article that is transportable by the vehicle 800 while the state of the article is kept in the deliverable state during the transport, even the type "clothes" of an article the state of which changes to the undeliverable state due to the condition in which "wetting" occurs.

Modified Example 1 of Embodiment 1

In Embodiment 1, a case where the period of time "from 09:00 to 09:30" is specified and the name of forecasted weather during the period of time "from 09:00 to 09:30" is "rain with strong wind" was described. However, a specified period of time and weather are not limited to those in the case, and, in the present modified example, the following description will be made using, as a specific example, a case where a period of time "from 09:30 to 10:00" is specified and the name of forecasted weather during the specified period of time is "clear with strong wind."

In the present modified example, when the information processing device 500 starts the execution of the order acceptance processing illustrated in FIG. 7, the information processing device 500, by executing the processing in steps S11 to S15 (steps S11 to S15), acquires information indicating the specified period of time "from 09:30 to 10:00."

Next, the information processing device 500 executes the type determination processing illustrated in FIG. 14 in order to determine the type of an article transportable during the specified period of time "from 09:30 to 10:00" (step S16).

When starting the execution of the type determination processing, the information processing device 500 acquires weather information indicating "strong wind" and weather information indicating "clear" that are associated with information indicating the specified period of time "from 09:30 to 10:00" in the forecast table in FIG. 6 (step S31).

Next, the determiner 540 of the information processing device 500 determines that, although there exists no condition information associated with the weather information indicating "clear", there exists condition information indicating a condition in which "shaking" occurs that is associated with the weather information indicating "strong wind" in the weather table in FIG. 10 (step S32; Yes). Thus, the determiner 540 identifies that the condition in which "shaking" occurs is generated by the weather "clear with strong wind" in the transport area during the period of time "from 09:30 to 10:00" (step S33).

Subsequently, the identifier 530 of the information processing device 500 acquires a vehicle ID associated with information indicating the specified period of time "from 09:30 to 10:00" from the schedule table in FIG. 13. In the present modified example, in the second record in the schedule table in FIG. 13, information indicating the period of time "from 09:30 to 10:00" and the vehicle ID "900" of the vehicle 900 that, when an order specifying the period of time "from 09:30 to 10:00" is accepted, is scheduled to transport the ordered article are associated with each other in advance and stored. Thus, the identifier 530 acquires the vehicle ID "900" associated with the information indicating the specified period of time "from 09:30 to 10:00" (step S34).

Next, the determiner 540 of the information processing device 500 acquires performance information associated with the identified vehicle ID "900" of the vehicle 900 from the performance table in FIG. 11 and acquires a flag indicating that the vehicle 900 has the wind-resistant performance from the performance information (step S35). Subsequently, the determiner 540 of the information processing device 500 acquires condition information indicating the condition in which "shaking" occurs that is associated with the information indicating the wind-resistant performance, from the condition table in FIG. 12 (step S36).

Next, the determiner 540 of the information processing device 500 excludes the condition information acquired in step S36 from the condition information acquired in step S33 (step S37) and determines that no condition information survives after the exclusion (step S38; No). Thus, the determiner 540 identifies that, even when the condition in which "shaking" occurs is generated by the weather "clear with strong wind", no shaking occurs or shaking scarcely occurs on an article stored in and transported by the vehicle 900 because of the wind-resistant performance of the vehicle 900.

Subsequently, the determiner 540 of the information processing device 500 determines the types respectively indicated by all the type information stored in the article table in FIG. 8 to be the types of transportable articles (step S43), and the information processing device 500 subsequently terminates the execution of the type determination processing.

Subsequently, the information processing device 500, by executing the processing in steps S17 to S21 in FIG. 7, accepts an order of an article transportable during the specified period of time "from 09:30 to 10:00" and subsequently terminates the execution of the order acceptance processing.

According to the above-described configuration, the deliverable state of an article includes a normal state in which the article normally operates, and the weather includes the weather "strong wind" in which a wind having a speed faster than a predetermined wind speed blows. Conditions causing the deliverable state of an article to change and conditions generated by weather include the condition in which "shaking" occurs, and the vehicle performance of the vehicle 900 includes the wind-resistant performance to suppress shaking of an article. Therefore, even when the weather in the transport area is the weather "strong wind", the vehicle 900 with the wind-resistant performance moving in the transport area with the article stored therein enables the article to be prevented from being shaken by the weather "strong wind." Thus, the information processing device 500 is capable of determining, to be the type of an article that is transportable by the vehicle 900 while the state of the article is kept in the deliverable state during the transport, even the type "precision equipment" of an article the state of which changes to the undeliverable state due to the condition in which "shaking" occurs.

Modified Example 2 of Embodiment 1

In Embodiment 1, a case where the period of time "from 09:00 to 09:30" is specified and the name of forecasted weather during the period of time "from 09:00 to 09:30" is "rain with strong wind" was described. However, a specified period of time and weather are not limited to those in the case, and, in the present modified example, the following description will be made using, as a specific example, a case where a period of time "from 10:00 to 10:30" is specified and the name of forecasted weather during the period of time is "clear."

In the present modified example, when starting the execution of the order acceptance processing illustrated in FIG. 7, the information processing device 500, by executing the processing in steps S11 to S15 (steps S11 to S15), acquires information indicating the specified period of time "from 10:00 to 10:30." Next, the information processing device 500 executes the type determination processing illustrated in FIG. 14 in order to determine the type of an article transportable during the specified period of time "from 10:00 to 10:30" (step S16).

When starting the execution of the type determination processing, the information processing device 500 acquires weather information indicating "clear" that is associated with information indicating the specified period of time "from 10:00 to 10:30" in the forecast table in FIG. 6 (step S31).

Next, the determiner 540 of the information processing device 500 determines that there exists no condition information associated with the weather information indicating "clear" in the weather table in FIG. 10 (step S32; No). Thus, the determiner 540 determines that a condition in which the weather "clear" causes the state of an article to be changed to the undeliverable state is not generated or is scarcely generated.

Subsequently, the determiner 540 determines the types respectively indicated by all the type information stored in the article table in FIG. 8 to be the types of transportable articles (step S43), and the information processing device 500 subsequently terminates the execution of the type determination processing.

Subsequently, the information processing device 500, by executing the processing in steps S17 to S21 in FIG. 7, accepts an order of an article transportable during the specified period of time "from 10:00 to 10:30" and subsequently terminates the execution of the order acceptance processing.

Modified Example 3 of Embodiment 1

In Embodiment 1, a case where the period of time "from 09:00 to 09:30" is specified and the name of forecasted weather during the period of time "from 09:00 to 09:30" is "rain with strong wind" was described. However, a specified period of time and weather are not limited to those in the case, and, in the present modified example, the following description will be made using, as a specific example, a case where a period of time "from 10:30 to 11:00" is specified and the name of forecasted weather during the period of time is "snow."

In the present modified example, when starting the execution of the order acceptance processing illustrated in FIG. 7, the information processing device 500, by executing the processing in steps S11 to S15 (steps S11 to S15), acquires information indicating the specified period of time "from 10:30 to 11:00."

Next, the information processing device 500 starts execution of the type determination processing in FIG. 14 (step S16) and acquires weather information indicating "snow" that is associated with information indicating the specified period of time "from 10:30 to 11:00" in the forecast table in FIG. 6 (step S31).

Next, the information processing device 500 executes the processing in steps S32 to S34 (steps S32 to S34). Through this processing, the information processing device 500 identifies that weather having the name "snow" causes the condition in which "wetting" occurs and the condition in which "low temperature" occurs to be generated and a vehicle that is scheduled to move during the specified period of time "from 10:30 to 11:00" is the vehicle 900. The reason why such identification is performed is that, in the present modified example, in the fourth record in the schedule table in FIG. 13, information indicating the period of time "from 10:30 to 11:00" and the vehicle ID "900" of the vehicle 900 are associated with each other in advance and stored.

Next, the information processing device 500 executes the processing in steps S35 to S38 (steps S35 to S38). Through this processing, the information processing device 500 identifies that the vehicle 900, although having the wind-resistant performance, has neither the waterproof performance nor the heat retention performance. The information processing device 500 also identifies that the wind-resistant performance that the vehicle 900 has cannot protect an article that the vehicle 900 transports from the condition in which "wetting" occurs and the condition in which "low temperature" occurs, which are generated by the weather "snow", and thus cannot suppress wetting and temperature reduction of the article.

Subsequently, the determiner 540 of the information processing device 500 acquires type information indicating the type "precision equipment" and type information indicating the type "clothes" that are associated with information indicating the condition in which "wetting" occurs in the type table in FIG. 9. The determiner 540 also acquires type information indicating the type "hot drink" that is associated with information indicating the condition "low temperature" in the type table. Through this processing, the determiner 540 determines the types "precision equipment", "clothes", and "hot drink" of articles to be the type of an article the state of which is not kept in the deliverable state and is changed to the undeliverable state during transport by the vehicle 900 by the conditions in which "wetting" occurs and the condition "low temperature", which are generated by the forecasted weather "snow" during the specified period of time "from 10:30 to 11:00" (step S39).

Subsequently, the determiner 540 of the information processing device 500 determines the types "precision equipment", "clothes", and "hot drink" to be the types of articles that are not transportable by the vehicle 900 in the transport area during the specified period of time "from 10:30 to 11:00" (step S40). In addition, the determiner 540 acquires the article IDs "G11" and "G12" associated with the type information indicating the type "precision equipment", the article ID "G21" associated with the type information indicating the type "clothes", and the article ID "G31" associated with the type information indicating the type "hot drink" in the article table in FIG. 8. Subsequently, the determiner 540 determines the articles "clock", "personal computer", "shirt", and "canned coffee" that are respectively identified by the acquired article IDs to be articles that are not transportable by the vehicle 900 in the transport area during the specified period of time.

In contrast, the determiner 540 of the information processing device 500 acquires type information that is different from the type information indicating the types "precision equipment", "clothes", and "hot drink" determined in step S39, out of a plurality of pieces of type information stored in the article table in FIG. 8. Next, the determiner 540 determines the type "snack" that is indicated by the acquired type information to be the type of an article the state of which is not changed from, but kept in the deliverable state during transport by the vehicle 900 by a condition generated by forecasted weather in the transport area during the specified period of time (step S41). Next, the determiner 540 determines the identified type "snack" to be the type of an article that is transportable by the vehicle 900 in the transport area during the specified period of time "from 10:30 to 11:00" (step S42).

The determiner 540 of the information processing device 500 also acquires the article ID "G41" that is associated with the type information indicating the type "snack" and determines the article "potato chips" that is identified by the acquired article ID to be an article that is transportable by the vehicle 900 in the transport area during the specified period of time, and the information processing device 500 subsequently terminates the execution of the type determination processing.

Subsequently, the information processing device 500, by executing the processing in steps S17 to S21 in FIG. 7, accepts an order of an article transportable during the specified period of time "from 10:30 to 11:00" and subsequently terminates the execution of the order acceptance processing.

Modified Example 4 of Embodiment 1

In Embodiment 1, a case where the period of time "from 09:00 to 09:30" is specified and the name of forecasted weather during the period of time "from 09:00 to 09:30" is "rain with strong wind" was described. However, a specified period of time and weather are not limited to those in the case, and, in the present modified example, the following description will be made using, as a specific example, a case where a period of time "from 11:00 to 11:30" is specified and the name of forecasted weather during the period of time "from 11:00 to 11:30" is "low atmospheric temperature and clear."

In the present modified example, when starting the execution of the order acceptance processing illustrated in FIG. 7, the information processing device 500, by executing the processing in steps S11 to S15 (steps S11 to S15), acquires information indicating the specified period of time "from 11:00 to 11:30."

Next, the information processing device 500 starts the execution of the type determination processing in FIG. 14 (step S16) and, by executing the processing in step S31 (step S31), acquires weather information indicating "low atmospheric temperature" and weather information indicating "clear."

Next, the information processing device 500 executes the processing in steps S32 to S34 (steps S32 to S34). Through this processing, the information processing device 500 identifies (i) that weather having the name "low atmospheric temperature and clear" causes the condition "low temperature" to be generated and (ii) that a vehicle that is scheduled to move during the specified period of time "from 11:00 to 11:30" is the vehicle 800. The reason for the identification of the vehicle 800 is that, in the present modified example, in the fifth record in the schedule table illustrated in FIG. 13, information indicating the period of time "from 11:00 to 11:30" and the vehicle ID "800" of the vehicle 800 are associated with each other in advance and stored.

Next, the information processing device 500 executes the processing in steps S35 to S38 (steps S35 to S38). Through this processing, the information processing device 500 identifies that the vehicle 800 has the heat retention performance and the heat retention performance of the vehicle 800 enables the state of an article to be suppressed from changing from the deliverable state to the undeliverable state due to the condition "low temperature" generated by the weather "low atmospheric temperature and clear."

Subsequently, the determiner 540 of the information processing device 500 determines the types respectively indicated by all the type information stored in the article table in FIG. 8 to be the types of transportable articles (step S43), and the information processing device 500 subsequently terminates the execution of the type determination processing. Subsequently, the information processing device 500, by executing the processing in steps S17 to S21 in FIG. 7, accepts an order of an article transportable during the specified period of time "from 11:00 to 11:30" and subsequently terminates the execution of the order acceptance processing.

According to the above-described configuration, the deliverable state of an article includes a warm temperature state in which the temperature of an article is within a predetermined range, and the weather includes the weather "low atmospheric temperature" in which atmospheric temperature is lower than a predetermined temperature. In addition, conditions causing the deliverable state of an article to change and conditions generated by weather include the condition "low temperature" in which temperature is lower than a predetermined temperature, and the vehicle performance includes the heat retention performance to suppress temperature reduction of an article. Therefore, even when the weather in the transport area is the weather "low atmospheric temperature", the vehicle 800 with the heat retention performance moving in the transport area with the article stored therein enables the temperature of the article to be prevented from being reduced due to the weather "low atmospheric temperature." Thus, the information processing device 500 is capable of determining, to be the type of an article that is transportable by the vehicle 800 while the state of the article is kept in the warm temperature state during the transport, even the type "hot drink" of an article the state of which is changed from the warm temperature state to a state different from the warm temperature state by the condition "low temperature".

Modified Example 5 of Embodiment 1

In Embodiment 1, it was described that the deliverable state of an article included a warm temperature state in which the temperature of an article is within a predetermined range, such as a range from 55° C. to 65° C., and the weather included the weather "low atmospheric temperature" in which atmospheric temperature is lower than a predetermined temperature. In Embodiment 1, it was also described that conditions causing the deliverable state of an article to change and conditions generated by weather included the condition "low temperature" in which temperature is lower than a predetermined temperature and the vehicle performance included the heat retention performance to suppress temperature reduction of an article.

However, Embodiment 1 is not limited to the above description, and, in the present modified example, the deliverable state of an article includes a cold temperature state in which the temperature of the article is within a predetermined range, such as a range from 5° C. to 10° C., or is a predetermined temperature, such as minus 18° C., or less and the weather includes weather "high atmospheric temperature" in which atmospheric temperature is higher than a predetermined temperature, such as 30° C. In addition, conditions causing the deliverable state of an article to change and conditions generated by weather include the condition "high temperature" in which temperature is higher than a predetermined temperature, and the vehicle performance includes cold retention performance to suppress rise in temperature of an article.

The storage cabinet 840 of the vehicle 800 according to the present modified example includes a cooling machine that includes a not-illustrated compressor that compresses and vaporizes a refrigerant, a condenser that liquefies the refrigerant, an expansion valve that lowers the boiling point of the refrigerant by lowering the pressure of the refrigerant, an evaporator that vaporizes the refrigerant, and a not-illustrated fan that circulates air, which is cooled by the refrigerant being vaporized in the evaporator, in the storage cabinet 840. The storage cabinet 840 also includes a not-illustrated IC temperature sensor that measures temperature in the storage cabinet 840 and a not-illustrated switch that, when measurement temperature represented by a signal output from the IC temperature sensor is not a temperature within a preset range, closes a circuit connected to the cooling machine and thereby operates the cooling machine. When the measurement temperature is a temperature within the preset range, the switch opens the circuit and thereby suspends the operation of the cooling machine.

Modified Example 6 of Embodiment 1

Although, in Embodiment 1, it was described that the vehicle performance to suppress wetting of an article included the waterproof performance, Embodiment 1 is not limited thereto, and the vehicle performance to suppress wetting of an article may include splash-proof performance.

Modified Example 7 of Embodiment 1

In Embodiment 1, it was described that the deliverable state of an article included all of the normal state, the dry state, and the warm temperature state and the weather included all of the weather "strong wind", the weather "rain", the weather "snow", and the weather "low atmospheric temperature." In Embodiment 1, it was also described that conditions causing the deliverable state of an article to change and conditions generated by weather included all of the condition in which "shaking" occurs, the condition in which "wetting" occurs, and the condition "low temperature" and the vehicle performance included all of the wind-resistant performance to suppress shaking of an article, the waterproof performance to suppress wetting of an article, and the heat retention performance to suppress temperature reduction of an article.

However, Embodiment 1 is not limited to the above description, and the deliverable state of an article may include at least one of the normal state, the dry state, the warm temperature state, or the cold temperature state. In addition, the weather may include at least one of the weather "strong wind", the weather "rain", the weather "snow", weather "hail", weather "sleet", weather "fog", weather "haze", the weather "low atmospheric temperature", or the weather "high atmospheric temperature." Further, the conditions causing the deliverable state of an article to change and the conditions generated by weather may include at least one of the condition in which "shaking" occurs, the condition in which "wetting" occurs, the condition "low temperature", or the condition "high temperature." Furthermore, the vehicle performance may include at least one of the wind-resistant performance, the waterproof performance, the splash-proof performance, the heat retention performance, or the cold retention performance.

Modified Example 8 of Embodiment 1

In Embodiment 1, it was described that an orderer requested transport of one article in one order. In the present embodiment, the description was made assuming that, with respect to one period of time, one order targeting one article is accepted and the vehicle 800 or 900 transports the one article.

However, Embodiment 1 is not limited to the above description, and, in the present modified example, an orderer requests transport of a plurality of articles in one order. In the present modified example, when, with respect to one period of time, one order targeting a plurality of articles is accepted, one or more of the vehicle 800 and 900 are scheduled to transport the plurality of articles the order of which has been accepted.

In the present modified example, in order to simplify description, the following description will be made using, as a specific example, a case where the orderer issues an order requesting transport of articles "clock", "shirt", "canned coffee", and "potato chips" to a transport destination during a period of time "from 12:00 to 12:30." In addition, in the present modified example, as a specific example, a case is used where, when forecasted weather in the transport area during the period of time is "low atmospheric temperature and clear with strong wind" and when the order specifying the period of time "from 12:00 to 12:30" is accepted, the vehicles 800 and 900 are scheduled to transport the plurality of ordered articles.

Thus, in the present modified example, in a not-illustrated schedule table, information indicating the period of time "from 12:00 to 12:30", the vehicle ID "800" of the vehicle 800, and the vehicle ID "900" of the vehicle 900 are associated with one another in advance and stored.

When starting the execution of the order acceptance processing illustrated in FIG. 7, the information processing device 500 according to the present modified example, by executing the processing in steps S11 to S15 (steps S11 to S15), acquires information indicating the specified period of time "from 12:00 to 12:30."

Next, the information processing device 500 starts the execution of the type determination processing in FIG. 14 (step S16) and, by executing the processing in step S31 (step S31), acquires weather information indicating "strong wind", weather information indicating "low atmospheric temperature", and weather information indicating "clear."

Next, the information processing device 500 executes the processing in steps S32 to S34 (steps S32 to S34). Through this processing, the information processing device 500 identifies (i) that weather having the name "low atmospheric temperature and clear with strong wind" causes the condition in which "shaking" occurs and the condition "low temperature" to be generated and (ii) that vehicles that are scheduled to move during the specified period of time "from 12:00 to 12:30" are the vehicle 800 and the vehicle 900.

Next, the information processing device 500 executes the processing in steps S35 to S38 (steps S35 to S38). Through this processing, the information processing device 500 identifies (i) that the vehicle 900 has the wind-resistant performance and (ii) that the wind-resistant performance of the vehicle 900 enables the state of an article to be suppressed from changing from the deliverable, normal state to the undeliverable state due to the condition in which "shaking" occurs, which is generated by the weather "low atmospheric temperature and clear with strong wind." Through this processing, the information processing device 500 also identifies that the vehicle 800 has the heat retention performance and the heat retention performance of the vehicle 800 enables the state of an article to be suppressed from changing from the deliverable warm temperature state to the undeliverable state due to the condition "low temperature", which is generated by the weather "low atmospheric temperature and clear with strong wind."

Subsequently, the determiner 540 of the information processing device 500 determines the types respectively indicated by all the type information stored in the article table in FIG. 8 to be the types of transportable articles (step S43), and the information processing device 500 subsequently terminates the execution of the type determination processing.

After having executed the type determination processing in step S16, the information processing device 500 executes the processing in steps S17 and S18 (steps S17 and S18). Through this processing, the acquirer 510 of the information processing device 500 acquires an order request that is sent from the terminal device 100 operated by the orderer and that includes the article ID "G11" of the article "clock", the article ID "G21" of the article "shirt", the article ID "G31" of the article "canned coffee", and the article ID "G41" of the article "potato chips"

Subsequently, the acceptor 550 of the information processing device 500 determines that all of the plurality of article IDs included in the order request coincide with any one of the one or plurality of article IDs of the articles determined to be transportable articles (step S19; Yes), and accepts the order (step S21).

Subsequently, the determiner 540 of the information processing device 500 acquires type information indicating "precision equipment" that is associated with the article ID "G11" included in the order request, in the article table in FIG. 8. Next, the determiner 540 acquires condition information indicating the condition in which "shaking" occurs and condition information indicating the condition in which "wetting" occurs that are associated with the type information indicating "precision equipment" in the type table in FIG. 9. In step S33, it is identified that, although the condition in which "wetting" occurs is not generated, the condition in which "shaking" occurs is generated by the weather "low atmospheric temperature and clear with strong wind", and, in step S35, it is identified that shaking of an article can be suppressed by the wind-resistant performance of the vehicle 900. Thus, the determiner 540 determines to cause the vehicle 900 to transport the article "clock" identified by the article ID "G11."

Likewise, the determiner 540 of the information processing device 500 acquires type information indicating "clothes" that is associated with the article ID "G21" included in the order request, in the article table in FIG. 8, and acquires condition information indicating the condition in which "wetting" occurs that is associated with the type information indicating "clothes" in the type table in FIG. 9. In step S33, it is identified that the condition in which "wetting" occurs is not generated by the weather "low atmospheric temperature and clear with strong wind." Thus, the determiner 540 determines the article "shirt" identified by the article ID "G21" to be an article that is transportable by both the vehicle 800 and the vehicle 900. Subsequently, the determiner 540 selects one of the vehicle 800 and the vehicle 900, based on a software-generated random number or a predetermined rule and determines to cause the selected one of the vehicle 800 and the vehicle 900 to transport the article "shirt." In the present modified example, the following description will be made using, as a specific example, a case where the vehicle 800 is selected.

Still likewise, the determiner 540 of the information processing device 500 acquires type information indicating "hot drink" that is associated with the article ID "G31" included in the order request, in the article table in FIG. 8, and acquires condition information indicating the condition "low temperature" that is associated with the type information indicating "hot drink" in the type table in FIG. 9. Since it is identified in step S33 that the condition "low temperature" is generated by the weather "low atmospheric temperature and clear with strong wind" and it is identified in step S35 that temperature reduction of an article can be suppressed by the heat retention performance of the vehicle 800, the determiner 540 determines to cause the vehicle 800 to transport the article "canned coffee" identified by the article ID "G31."

Still likewise, the determiner 540 of the information processing device 500 acquires type information indicating "snack" that is associated with the article ID "G41" included in the order request, in the article table in FIG. 8, and determines that there exists no condition information associated with the type information indicating "snack" in the type table in FIG. 9. Thus, the determiner 540 identifies that the article "potato chips" identified by the article ID "G41" is an article that is transportable by both the vehicle 800 and the vehicle 900. Subsequently, the determiner 540 selects one of the vehicle 800 and the vehicle 900 and determines to cause the selected one of the vehicle 800 and the vehicle 900 to transport the article "potato chips." In the present modified example, the following description will be made using, as a specific example, a case where the vehicle 900 is selected.

The vehicle 800 according to the present modified example stores the articles "canned coffee" and "potato chips" into the storage cabinet 840 and flies to the transport destination. The vehicle 900 according to the present modified example surrounds and holds a cardboard box packaging the articles "clock" and "clothes", using the first holding frame 941a and the second holding frame 941b and flies to the transport destination.

Modified Example 9 of Embodiment 1

Figure 19:
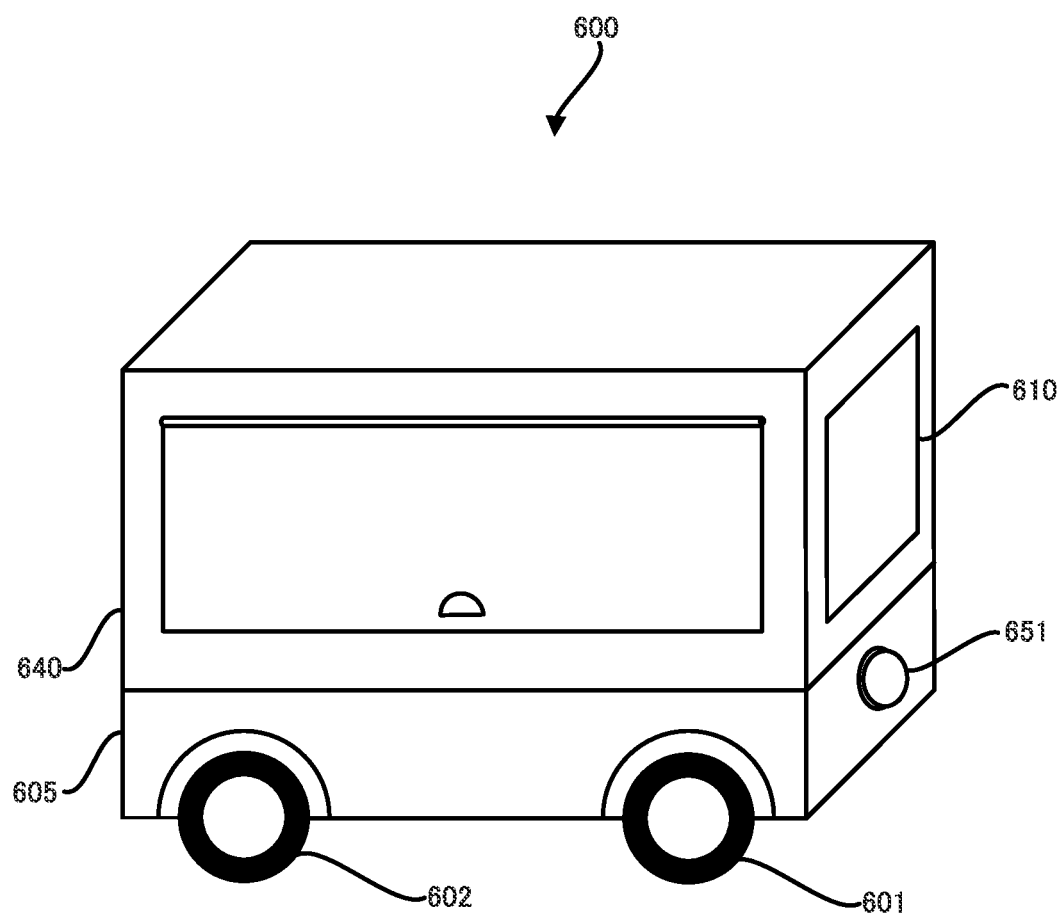
FIG. 19 is an appearance configuration diagram illustrating an example of an appearance of a vehicle according to Modified Example 9 of Embodiment 1.

Although, in Embodiment 1, it was described that the transport system 1 included the vehicle 800, which is an unmanned aircraft, Embodiment 1 is not limited thereto. The transport system 1 according to the present modified example includes, in place of the vehicle 800, a vehicle 600 that is an unmanned ground vehicle as illustrated in FIG. 19.

The vehicle 600 includes a chassis 605 that is provided with a plurality of wheels including wheels 601 and 602 and a storage cabinet 640 that is installed on the upper surface of the chassis 605. A configuration and functions of the storage cabinet 640 that the vehicle 600 includes are the same as the configuration and the functions of the storage cabinet 840 that the vehicle 800 includes. Thus, the vehicle 600, as with the vehicle 800, has the waterproof performance and the heat retention performance.

Distance between wheels of the vehicle 600 is equal to or less than a predetermined distance, size of the vehicle 600 is equal to or less than a predetermined size, and mass of the vehicle 600 is equal to or less than a predetermined mass. Generally, shaking that occurs on a vehicle when the vehicle travels increases as the distance between wheels decreases, the size decreases, and the mass decreases. Thus, when the vehicle 600 on a road surface on which a wind having a speed faster than a predetermined wind speed blows, a large shaking occurs on the vehicle 600 to the extent that the state of an article the type of which is "precision equipment" changes from a normal state that is a deliverable state to a failed state. Thus, the vehicle 600 does not have the wind-resistant performance.

The vehicle 600 includes a LiDAR sensor 651 that is installed on the front surface of the chassis 605 and a not-illustrated LiDAR sensor that is installed on the back surface of the chassis 605. Configurations and functions of the LiDAR sensor 651 on the front surface and the LiDAR sensor on the back surface are the same as the configurations and functions of the LiDAR sensor 851 on the front surface and the LiDAR sensor on the back surface that the vehicle 800 includes.

The vehicle 600 also includes a control device 610 that, based on signals output by the LiDAR sensor 651 on the front surface and the LiDAR sensor on the back surface, drives not-illustrated motors that are respectively installed in a plurality of wheels, in such a way that the vehicle 600 travels on a transport route of an article while avoiding obstacles. The control device 610 includes a not-illustrated CPU, RAM, ROM, flash memory, data communication circuit, video card, display device, input device, location measurement circuit, input/output port, and drive circuit. Configurations and functions of the above-described hardware components of the control device 610 are the same as the hardware configurations and functions that the control device 810 of the vehicle 800 includes.

The not-illustrated drive circuit of the control device 610 that the vehicle 600 includes is connected to cables that are respectively connected to the not-illustrated plurality of motors, which respectively rotate the plurality of wheels including the wheels 601 and 602, and drives the plurality of motors in accordance with signals output by the non-illustrated CPU.

When the not-illustrated data communication circuit receives a transport command from the information processing device 500, the CPU of the vehicle 600 executes the same processing as the transport control processing illustrated in FIG. 17. Thus the vehicle 600 travels on the ground to a transport destination and thereby transports an article.

Modified Example 10 of Embodiment 1

Figure 20:
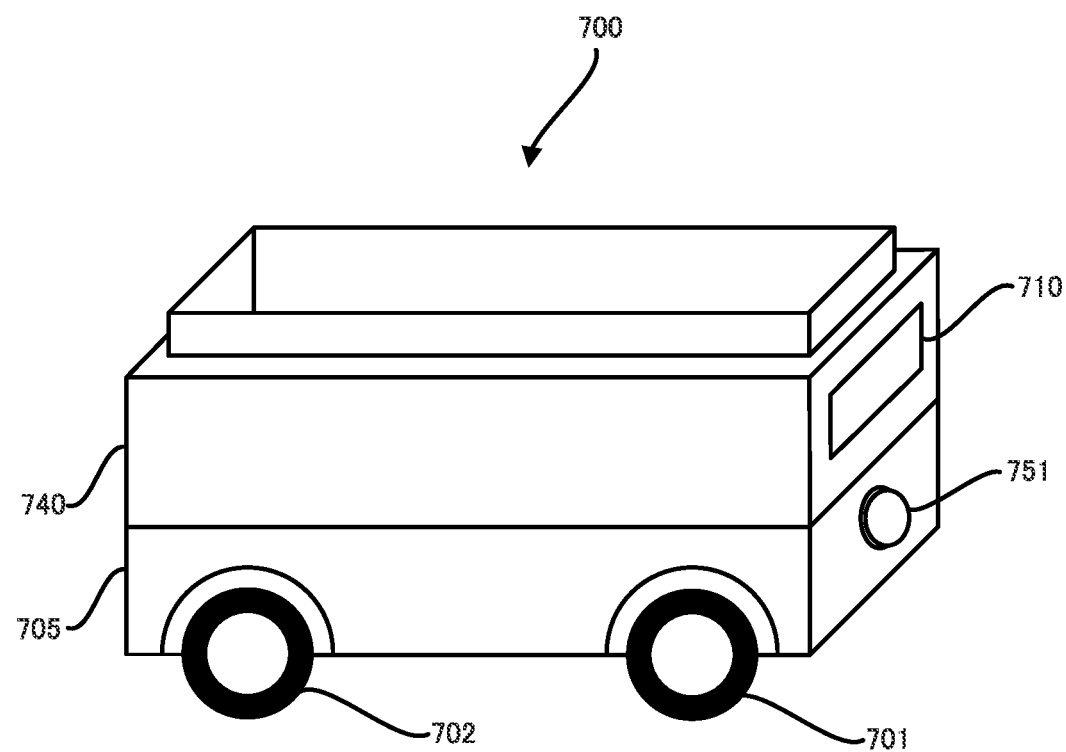
FIG. 20 is an appearance configuration diagram illustrating an example of an appearance of a vehicle according to Modified Example 10 of Embodiment 1.

Although, in Embodiment 1, it was described that the transport system 1 included the vehicle 900, which is an unmanned aircraft, Embodiment 1 is not limited thereto. The transport system 1 according to the present modified example includes, in place of the vehicle 900, a vehicle 700 that is an unmanned ground vehicle as illustrated in FIG. 20.

The vehicle 700 includes a chassis 705 that is provided with a plurality of wheels including wheels 701 and 702 and a storage cabinet 740 that is installed on the upper surface of the chassis 705.

Distance between wheels of the vehicle 700 is longer than the predetermined distance, size of the vehicle 700 is larger than the predetermined size, and mass of the vehicle 700 is greater than the predetermined mass. Thus, even when the vehicle 700 travels on a road surface on which a wind blows at a speed faster than a predetermined wind speed and slower than a maximum wind speed that has ever been observed in the transport area in the past, no shaking occurs on the vehicle 700 or only a small shaking occurs on the vehicle 700 to the extent that the state of an article the type of which is "precision equipment" is kept in a deliverable state. Thus, the vehicle 700, as with the vehicle 900 in Embodiment 1, has the wind-resistant performance.

The storage cabinet 740 of the vehicle 700 has the upper surface of the chassis 705 used as a loading surface for an article and includes four side plates that rises from the loading surface in the vertical direction and that are respectively installed on the front side and the rear side and on the right-hand side and the left-hand side when the vehicle 700 faces forward. Since the four side plates and the loading surface of the storage cabinet 740 form a space the upper part of which is opened, it is difficult to suppress wetting of an article due to, for example, rain or snow. Thus, the vehicle 700, as with the vehicle 900 in Embodiment 1, does not have the waterproof performance. In addition, since the vehicle 700, as with the vehicle 900 in Embodiment 1, does not include a heater, the vehicle 700 does not have the heat retention performance.

The vehicle 700 includes a LiDAR sensor 751 that is installed on the front surface of the chassis 705, a not-illustrated LiDAR sensor that is installed on the back surface of the chassis 705, and a control device 710 that, based on signals that these sensors output, drives not-illustrated motors respectively installed in the plurality of wheels.

The control device 710 included in the vehicle 700 executes the same processing as the not-illustrated transport control processing that the vehicle 900 in Embodiment 1 executes. Thus the vehicle 700 travels on the ground to a transport destination and thereby transports an article.

Modified Example 11 of Embodiment 1

In Modified Example 9 of Embodiment 1, it was described that the transport system 1 included the vehicle 600, which is an unmanned ground vehicle, and the vehicle 900, which is an unmanned aircraft. In addition, in Modified Example 10 of Embodiment 1, it was described that the transport system 1 included the vehicle 800, which is an unmanned aircraft, and the vehicle 700, which is an unmanned ground vehicle. However, Embodiment 1 is not limited to the configurations, and the transport system 1 may include any one or more of the vehicles 600 and 700, which are unmanned ground vehicles, and the vehicles 800 and 900, which are unmanned aircrafts. In addition, the transport system 1 may include N vehicles that are unmanned ground vehicles and M vehicles that are unmanned aircrafts (where N and M are natural numbers).

Modified Example 12 of Embodiment 1

In Embodiment 1, it was described that the data communication circuit 504a of the information processing device 500 received information indicating the name of forecasted weather in the transport area from a weather forecast server and the acquirer 510, based on the received information, acquired weather information indicating the forecasted weather. However, Embodiment 1 is not limited to the configuration, and the data communication circuit 504a of the information processing device 500 may receive information indicating the name of latest weather that has been observed in the transport area from a weather forecast server, and the acquirer 510 may, based on the received information, acquire weather information indicating the latest weather. In addition, information that the data communication circuit 504a receives is not necessarily limited to the information indicating the name of latest weather that has been observed and may be, for example, information indicating the name of weather that had been observed since a time earlier than a reception time at which the weather forecast server received a send request by a predetermined period until the reception time.

Modified Example 13 of Embodiment 1

In Embodiment 1, it was described that, when the article ID included in an order request did not coincide with any of the article IDs of one or a plurality of articles that is transportable during the specified period of time, the acceptor 550 of the information processing device 500 restricted acceptance of the order. However, Embodiment 1 is not limited to the configuration, and the acceptor 550 may restrict acceptance of the order when the article ID included in the order request coincides with any one of the article IDs of one or a plurality of articles that is not transportable during the specified period of time.

In addition, the acceptor 550 of the information processing device 500 may acquire type information associated with the article ID included in the order request, in the article table in FIG. 8 and may restrict acceptance of the order when the acquired type information does not coincide with any of pieces of type information indicating the types of articles that are transportable during the specified period of time. In addition, Embodiment 1 is not limited to the configuration, the acceptor 550 may restrict acceptance of the order when the acquired type information coincides with any one of the type information indicating the types of articles that are not transportable during the specified period of time.

Modified Example 14 of Embodiment 1

In Embodiment 1, it was described that the acceptor 550 of the information processing device 500 generated a list including a plurality of article IDs stored in the article table in FIG. 8 and the names of articles respectively identified by the article IDs and output information indicating the generated list to the data communication circuit 504a with the terminal device 100 as the destination. It was also described that, subsequently, when the article ID included in an order request received from the terminal device 100 did not coincide with any of the article IDs of one or a plurality of articles that is transportable, the acceptor 550 restricted acceptance of the order.

However, Embodiment 1 is not limited to the configuration, and the acceptor 550 of the information processing device 500 may generate a list that includes the article IDs and the names of one or a plurality of articles that is transportable and that does not include the article ID and the name of an article that is not transportable. In addition, the acceptor 550 may, by outputting information indicating the list not including the article ID and the name of an article that is not transportable to the data communication circuit 504a with the terminal device 100 as the destination, restrict acceptance of an order targeting an article that is not transportable.

Modified Example 15 of Embodiment 1

Although, in Embodiment 1, it was described that the transport destination was a location determined by the administrator of the transport system 1 in advance, Embodiment 1 is not limited thereto, and, in the present modified example, the transport destination is set in advance by a user who is an orderer.

Thus, in the not-illustrated user table that the information storage 590 of the information processing device 500 stores, a user ID identifying the user and information indicating the location of the transport destination in latitude, longitude, and altitude that has been set in advance by the user are associated with each other and stored in advance.

The acquirer 510 of the information processing device 500 acquires information indicating the location of a transport destination associated with a user ID from the user table in step S31 in FIG. 14. Next, the acquirer 510 acquires information indicating the location of the office that the information storage 590 stores in advance.

Subsequently, the determiner 540 of the information processing device 500 reads a not-illustrated partial route table in which information relating to partial routes that the vehicles 800 and 900 can fly, such as an airspace above a road and a river, is stored, from the information storage 590. In the partial route table, a plurality of records is stored in advance, and, in each record, the latitude, longitude, and altitude of the start node of an edge that is a partial route, the latitude, longitude, and altitude of the end node of the edge, and information representing distance of the edge are associated with one another and stored in advance.

Next, the determiner 540 of the information processing device 500 executes a route search algorithm, such as Dijkstra's algorithm, using information indicating the location of the office, information indicating the start nodes and the end nodes of a plurality of edges, and information indicating the location of the transport destination. Through this processing, the determiner 540 determines a shortest transport route starting from the office and reaching the transport destination by combining partial routes and determines an area including the determined transport route as a transport area.

Subsequently, the acquirer 510 of the information processing device 500, by executing the same processing as the processing described in Embodiment 1, acquires weather information indicating forecasted weather in the transport area during the specified period of time from the not-illustrated weather forecast server.

According to the configurations, since the acquirer 510 of the information processing device 500 acquires information indicating the transport destination specified by the user, it is possible to improve a degree of freedom in specification of a transport destination, and it is thus possible to improve convenience for users.

Modified Example 16 of Embodiment 1

Although, in Embodiment 1, it was described that the vehicles 800 and 900 were unmanned aircrafts, Embodiment 1 is not limited thereto, and the vehicles 800 and 900 may be unmanned flying objects. Although, in Embodiment 1, it was described that the vehicles 800 and 900 were drones that gain lift and thrust from the propellers 831 to 834 and the propeller 931 to 934, respectively, Embodiment 1 is not limited thereto. Each of the vehicles 800 and 900 may include wings and gain lift from the wings or may include a gasbag filled with gas the specific gravity of which is lower than air and gain lift from the gasbag. In addition, each of the vehicles 800 and 900 may include a jet engine or a rocket engine and gain thrust from the jet engine or the rocket engine.

Further, each of the vehicles 600 to 900 do not necessarily be unmanned, and provided that, with the exception of control by the information processing device 500, the vehicle is an object that autonomously moves, a person may be on board the vehicle.

Modified Example 17 of Embodiment 1

Although, in Embodiment 1, it was described that the information processing device 500 included the information storage 590, Embodiment 1 is not limited thereto. The information processing device 500 according to the present modified example does not include the information storage 590. The information processing device 500 according to the present modified example is connected to a not-illustrated information storage device that is, for example, a network attached storage (NAS) and that has the same functions as the functions of the information storage 590, via the Internet IN. The transport system 1 according to the present modified example may include an information storage device or does not have to include an information storage device. The information processing device 500 according to the present modified example, using information that the information storage device stores, executes the order acceptance processing illustrated in FIG. 7 and the type determination processing illustrated in FIG. 14.

Modified Example 18 of Embodiment 1

Although, in Embodiment 1, it was described that the terminal device 100 was a smartphone, Embodiment 1 is not limited thereto, and the terminal device 100 may be a tablet-type personal computer or a laptop-type personal computer.

Embodiment 2

It was described that the information processing device 500 according to Embodiment 1 acquired an order request after having acquired information indicating a specified period of time specified by an orderer and, when an article ordered by the order coincided with any one of articles that were transportable during the specified period of time, accepted the order. In contrast, an information processing device 500 according to the present embodiment accepts an order when, after having acquired an order request, acquiring information indicating a specified period of time specified by an orderer within one or a plurality of periods of time during which an article targeted by the order is transportable. Although, hereinbelow, as for the same constituent components as those in Embodiment 1, description will be made using the same reference numerals as those used in Embodiment 1, the description will focus on differences between the present embodiment and Embodiment 1.

The information processing device 500 according to the present embodiment executes order acceptance processing as illustrated in FIG. 21. When starting the execution of the order acceptance processing, the information processing device 500 executes the same processing as the processing in steps S11 to S13 in FIG. 7 (steps S61 to S63). Through this processing, the information processing device 500 user-authenticates an orderer who operates a terminal device 100.

Next, the information processing device 500 executes the same processing as the processing in steps S17 and S18 in FIG. 7 (steps S64 and S65). Through this processing, the information processing device 500 sends, to the terminal device 100, information indicating a list that includes a plurality of pairs of an article ID stored in an article table in FIG. 8 and a name of an article identified by the article ID, and subsequently receives an order request from the terminal device 100.

Figure 22A:
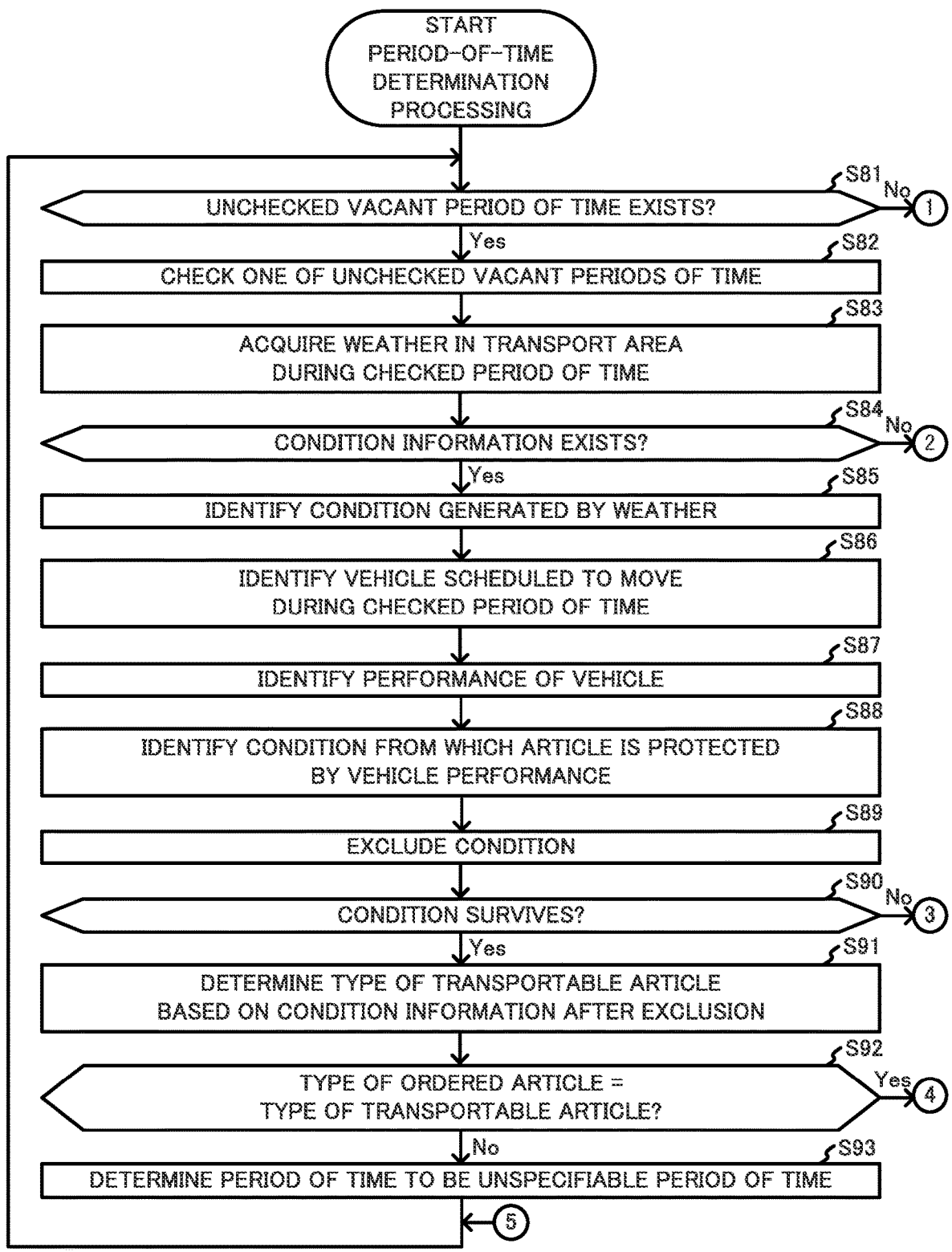

Next, the information processing device 500 executes period-of-time determination processing, as illustrated in FIGS. 22A and 22B, of determining a specifiable period of time that the orderer can specify as a period of time during which an ordered article is to be transported (step S66).

When the execution of the period-of-time determination processing is started, a determiner 540 of the information processing device 500 acquires one or a plurality of records in which no article ID of an article the order of which has been accepted is stored, but characters "NULL" are stored in a schedule table in FIG. 13. Through this processing, the determiner 540 identifies one or a plurality of periods of time that is indicated by pieces of information respectively stored in the acquired one or plurality of records, as vacant periods of time that are periods of time for which no order has been accepted.

Subsequently, the determiner 540 of the information processing device 500 determines whether or not there exists a vacant period of time that has not been checked among the identified one or plurality of vacant periods of time (step S81). On this occasion, when the determiner 540 determines that there exists a vacant period of time that has not been checked (step S81; Yes), the determiner 540 sets one of the vacant periods of time that have not been checked, as a target of a check and sets the vacant period of time as a checked period of time (step S82).

Next, the determiner 540 of the information processing device 500, by executing the same processing as the processing in step S31 in FIG. 14, acquires weather information indicating weather in a transport area during the checked period of time.

Subsequently, the determiner 540 of the information processing device 500, as with the processing in step S32 in FIG. 14, determines whether or not there exists condition information associated with the acquired weather information in a weather table in FIG. 10 (step S84). On this occasion, when the determiner 540 determines that condition information exists (step S84; Yes), the determiner 540 determines that a condition causing a deliverable state of an article to change is generated by the weather in the transport area during the checked period of time.

Next, the information processing device 500 executes the same processing as the processing in steps S33 to S37 in FIG. 14 (steps S85 to S89). Through this processing, the information processing device 500 identifies a vehicle 800 or 900 that is scheduled to move in the transport area during the checked period of time. In addition, the information processing device 500 excludes a condition from which the article is protected by vehicle performance of the identified vehicle 800 or 900 from the conditions generated by the weather in the transport area during the checked period of time.

Subsequently, the determiner 540 of the information processing device 500, by executing the same processing as the processing in step S38 in FIG. 14, determines whether or not at least a piece of condition information survives after the exclusion (step S90). On this occasion, when the determiner 540 determines that a piece of condition information survives (step S90; Yes), the determiner 540 determines that, among one or a plurality of conditions generated by the weather in the transport area during the checked period of time, a condition exists that causes the state of the article that is to be stored and transported by the vehicle 800 or 900 scheduled to move in the transport area during the checked period of time to change from an undeliverable state to the deliverable state.

Next, the determiner 540 of the information processing device 500, by executing the same processing as the processing in step S39 to S42 in FIG. 14, determines the type of an article that is transportable by the vehicle 800 or 900 scheduled to move in the transport area during the checked period of time, based on the condition information that survives after the exclusion (step S91).

Subsequently, the determiner 540 of the information processing device 500 acquires type information associated in the article table in FIG. 8 with the article ID acquired from the order request in step S65 in FIG. 21 and thereby identifies the type of the ordered article. Next, the determiner 540 determines whether or not the type of the ordered article coincides with any one of the types determined in step S91 (step S92).

On this occasion, when the determiner 540 of the information processing device 500 determines that the type of the ordered article does not coincide with any of the types determined in step S91 (step S92; No), the determiner 540 determines the checked period of time to be an unspecifiable period of time that cannot be specified as a period of time during which the ordered article is to be transported (step S93). Subsequently, the above-described processing is repeated from step S81.

When, in step S84, it is determined that there exists no condition information (step S84; No) or, in step S90, it is determined that no condition information survives (step S90; No), the determiner 540 of the information processing device 500 determines that no condition is generated that causes the state of an article that is to be transported by the vehicle 800 or 900 scheduled to move in the transport area during the checked period of time to change from the deliverable state to the undeliverable state. Subsequently, the determiner 540 determines all the types indicated by the information stored in the article table in FIG. 8 to be the types of articles that are transportable by the vehicle 800 or 900 scheduled to move in the transport area during the checked period of time (step S94).

When, in step S92, it is determined that the type of the ordered article coincides with any one of the types of transportable articles determined in step S91 (step S92; Yes) or after, in step S94, it has been determined that all the types are types of transportable articles, the determiner 540 of the information processing device 500 determines that the checked period of time is a specifiable period of time (step S95). Subsequently, the above-described processing is repeated from step S81.

When, in step S81, the determiner 540 of the information processing device 500 determines that there exists no vacant period of time that has not been checked (step S81; No), the information processing device 500 terminates the execution of the period-of-time determination processing.

After the period-of-time determination processing has been executed in step S66 in FIG. 21, the determiner 540 of the information processing device 500 determines whether or not there exists a specifiable period of time (step S67). On this occasion, when the determiner 540 determines that there exists no specifiable period of time (step S67; No), the determiner 540, by executing the same processing as the processing in step S20 in FIG. 7, restricts acceptance of the order (step S68).

Subsequently, an outputter 560 of the information processing device 500 outputs a restriction notification notifying that acceptance of the order is restricted to a data communication circuit 504a with the terminal device 100 as the destination, and the information processing device 500 subsequently terminates the execution of the order acceptance processing.

In contrast, when the determiner 540 of the information processing device 500 determines that there exists a specifiable period of time (step S67; Yes), the determiner 540 executes the same processing as the processing in steps S14, S15, and S21 in FIG. 7 in order (steps S69 to S71). Through this processing, the information processing device 500 accepts the order when acquiring information indicating a specified period of time specified by the orderer within the one or plurality of specifiable periods of time.

Subsequently, the outputter 560 of the information processing device 500 outputs an acceptance notification notifying that the order has been accepted to the data communication circuit 504a with the terminal device 100 as the destination, and the information processing device 500 subsequently terminates the execution of the order acceptance processing.

According to the above-described configuration, the information processing device 500 accepts an order when, after having acquired an order request, acquiring information indicating a specified period of time specified by the orderer within one or a plurality of periods of time during which an ordered article is transportable. Thus, the information processing device 500 is capable of increasing the probability that an order is accepted, compared with, for example, a case of, after having acquired information indicating a specified period of time, acquiring an order request and, when the ordered article is transportable during the specified period of time, accepting the order. Thus, the information processing device 500 is capable of improving convenience of orderers.

Embodiment 3

An information processing device 500 according to the present embodiment differs from the information processing device 500 according to Embodiment 1 in executing advancement processing, as illustrated in FIG. 23, of, with respect to an article that is determined to be not transportable during a specified period of time due to change in weather, advancing the period of time during which the article is to be transported to an earlier period of time. Although, hereinbelow, as for the same constituent components as those in Embodiment 1, description will be made using the same reference numerals as those used in Embodiment 1, the description will focus on differences between the present embodiment and Embodiment 1.

When being started up, a CPU 501 of the information processing device 500 according to the present embodiment executes the advancement processing in FIG. 23 in place of not-illustrated weather acquisition processing described in Embodiment 1. The reason why the advancement processing is executed in place of the weather acquisition processing is that, in the present embodiment, weather information is acquired in the advancement processing.

When the execution of the advancement processing in FIG. 23 is started, an acquirer 510 of the information processing device 500 acquires, out of a plurality of records stored in a schedule table illustrated in FIG. 13, a plurality of pieces of information indicating periods of time. Next, the acquirer 510 determines whether or not there exists a period of time that has not been checked among a plurality of periods of time respectively indicated by the acquired plurality of pieces of information (step S101). On this occasion, when the acquirer 510 determines that there exists a period of time that has not been checked (step S101; Yes), the acquirer 510 sets the earliest period of time among the periods of time that have not been checked as a target of a check (step S102).

Next, the acquirer 510 of the information processing device 500, by executing the same processing as the processing described in Embodiment 1, acquires weather information indicating forecasted weather in a transport area during the checked period of time from a not-illustrated weather forecast server (step S103). Next, the acquirer 510 acquires weather information that is associated with information indicating the checked period of time from a forecast table illustrated in FIG. 6 (step S104). In the description of the present disclosure, by referring to the weather information acquired in step S103 as reacquired weather information or current weather information and referring to the weather information acquired from the forecast table as previously-acquired weather information or previous weather information, the two pieces of weather information are discriminated from each other.

Next, the acquirer 510 of the information processing device 500 updates the weather information associated in the forecast table with the information indicating the checked period of time with the reacquired weather information (step S105).

Next, a determiner 540 of the information processing device 500 determines whether or not the checked period of time is a vacant period of time for which no order has been accepted yet, based on whether or not the information indicating the checked period of time and characters "NULL" are associated with each other in the schedule table in FIG. 13 (step S106). On this occasion, when the information indicating the checked period of time is not associated with any article ID, but is associated with the characters "NULL" in the schedule table, the determiner 540 determines that the checked period of time is a vacant period of time (step S106; Yes). Thus, since no order that specifies the checked period of time has been accepted, the determiner 540 determines that it is not necessary to execute processing of advancing the period of time during which an ordered article is to be transported from the checked period of time to a period of time earlier than the checked period of time. Subsequently, the above-described processing is repeated from step S101.

In contrast, when information indicating the checked period of time is associated with an article ID, but is not associated with the characters "NULL" in the schedule table, the determiner 540 of the information processing device 500 determines that the checked period of time is not a vacant period of time (step S106; No).

Next, the determiner 540 of the information processing device 500 determines whether or not forecasted weather in the transport area during the checked period of time has changed, based on whether or not the reacquired weather information and the previously-acquired weather information coincide with each other (step S107).

On this occasion, when the reacquired weather information and the previously-acquired weather information are the same, the determiner 540 of the information processing device 500 determines that the forecasted weather has not changed (step S107; No). Thus, the determiner 540 determines that, since an article ordered by an order remains transportable during the checked period of time, it is not necessary to execute the processing of advancing the period of time during which the article is to be transported to an earlier period of time. Subsequently, the above-described processing is repeated from step S101.

In contrast, when the reacquired weather information and the previously-acquired weather information differ from each other, the determiner 540 of the information processing device 500 determines that the forecasted weather has changed (step S107; Yes).

Subsequently, the same processing as the processing in steps S32 to S43 in FIG. 14 is executed based on the reacquired weather information. Through this processing, based on the reacquired weather information, the type of an article that is transportable in the transport area during the checked period of time is determined (step S108).

Next, the determiner 540 of the information processing device 500 acquires an article ID associated with the information indicating the checked period of time in the schedule table in FIG. 13 and acquires type information associated with the acquired article ID in an article table in FIG. 8. Subsequently, the determiner 540 determines whether or not the article remains a transportable article after the forecasted weather has changed, based on whether or not the type of the article indicated by the acquired type information is included in the types that are determined based on the reacquired weather information (hereinafter, referred to as redetermined types) (step S109).

On this occasion, when the type of the article targeted by the order is included in the redetermined types, the determiner 540 of the information processing device 500 determines that the article remains a transportable article after the weather has changed (step S109; Yes). Thus, the determiner 540 determines that it is not necessary to execute the processing of advancing the period of time during which the article is to be transported to an earlier period of time. Subsequently, the above-described processing is repeated from step S101.

In contrast, when the type of the article ordered by the order is not included in the redetermined types, the determiner 540 of the information processing device 500 determines that the article has ceased to be a transportable article due to change in the weather (step S109; No). Subsequently, the determiner 540, by executing period-of-time determination processing illustrated in FIGS. 22A and 22B (step S110), determines one or a plurality of specifiable periods of time that has become specifiable as a period of time during which the article is to be transported due to the change in the weather. Next, the determiner 540 identifies one or a plurality of specifiable periods of time that is earlier than the checked period of time out of the one or plurality of specifiable periods of time.

Subsequently, an outputter 560 of the information processing device 500 generates a message inquiring whether (i) the period of time during which the article targeted by the order is to be transported is advanced from the checked period of time to any one of the one or plurality of specifiable periods of time that are earlier than the checked period of time or (ii) the order is canceled. Next, the outputter 560 outputs an advancement inquiry including the generated message to a data communication circuit 504a with a terminal device 100 as the destination (step S111).

When a data communication circuit 104a of the terminal device 100 receives the advancement inquiry, a CPU 101 causes a display device 105b to display a message included in the advancement inquiry. When an orderer who has visually recognized the display operates an input device 105c of the terminal device 100, the input device 105c outputs a signal in response to the operation. Next, the CPU 101 of the terminal device 100, based on the signal output from the input device 105c, generates an advancement request including information indicating a specified period of time specified by the orderer within the one or plurality of specifiable periods of time or a cancellation request requesting cancellation of the order. Subsequently, the CPU 101 of the terminal device 100 outputs the generated request to the data communication circuit 104a with the information processing device 500 as the destination.

When the data communication circuit 504a of the information processing device 500 receives an advancement request, an acceptor 550 determines that advancement of the period of time during which the article is to be transported is requested (step S112; Yes). Next, the acceptor 550 acquires the advancement request from the data communication circuit 504a and acquires information indicating a specified period of time from the advancement request.

Subsequently, the acceptor 550 acquires an article ID associated with the information indicating the checked period of time in the schedule table in FIG. 13. Next, the acceptor 550 associates the acquired article ID with the acquired information indicating the specified period of time and stores the associated information in the schedule table. Subsequently, the acceptor 550 updates the article ID associated with the information indicating the checked period of time with the characters "NULL", in the schedule table. Through this processing, the acceptor 550 accepts the advancement request and advances the period of time during which the article targeted by the order is to be transported from the checked period of time to a period of time that is specified by the orderer, that is earlier than the checked period of time, and during which the article is transportable (step S113). Subsequently, the above-described processing is repeated from step S101.

In contrast, when the data communication circuit 504a of the information processing device 500 receives a cancellation request, the acceptor 550 determines that advancement of the period of time during which the article is to be transported is not requested and cancellation of the order is requested (step S112; No). Next, the acceptor 550, by updating the article ID associated with the information indicating the checked period of time with the characters "NULL" in the schedule table, accepts the cancellation request and cancels the order (step S114). Subsequently, the above-described processing is repeated from step S101.

When, in step S101, the acquirer 510 of the information processing device 500 determines that there exists no period of time that has not been checked (step S101; No), the information processing device 500 terminates the execution of the advancement processing.

A controller 570 of the information processing device 500, by executing not-illustrated transport control processing described in Embodiment 1, performs control of causing an article to be transported during an advanced period of time on a vehicle 800 or 900.

According to the above-described configuration, the acquirer 510 of the information processing device 500 acquires weather information indicating weather in the transport area during the checked period of time again. In addition, when the reacquired weather information and the previously-acquired weather information are different from each other, the determiner 540, based on the reacquired weather information, determines the type of an article that is transportable in the transport area during the checked period of time again. Further, when the type of an article the transport of which during the checked period of time is specified is different from the redetermined type, the outputter 560 outputs an advancement inquiry inquiring whether or not the period of time during which the article is to be transported is advanced to a period of time that is earlier than the checked period of time and during which the article is transportable. In addition, when acquiring an advancement request, the acceptor 550 advances the period of time during which the article is to be transported, and the controller 570 performs control of causing the article to be transported during the advanced period of time on the vehicle 800 or 900. Thus, when change in weather after an order has been accepted causes an ordered article to be not transportable during a period of time having been specified before the change in weather, the information processing device 500 is capable of causing the article to be transported during a period of time that is earlier than the specified period of time. Since, for this reason, the information processing device 500 is capable of further reducing a period from an order is accepted until transport is performed, the information processing device 500 is capable of, for example, improving storage efficiency of a warehouse that stores articles.

Embodiment 4

Figure 24:
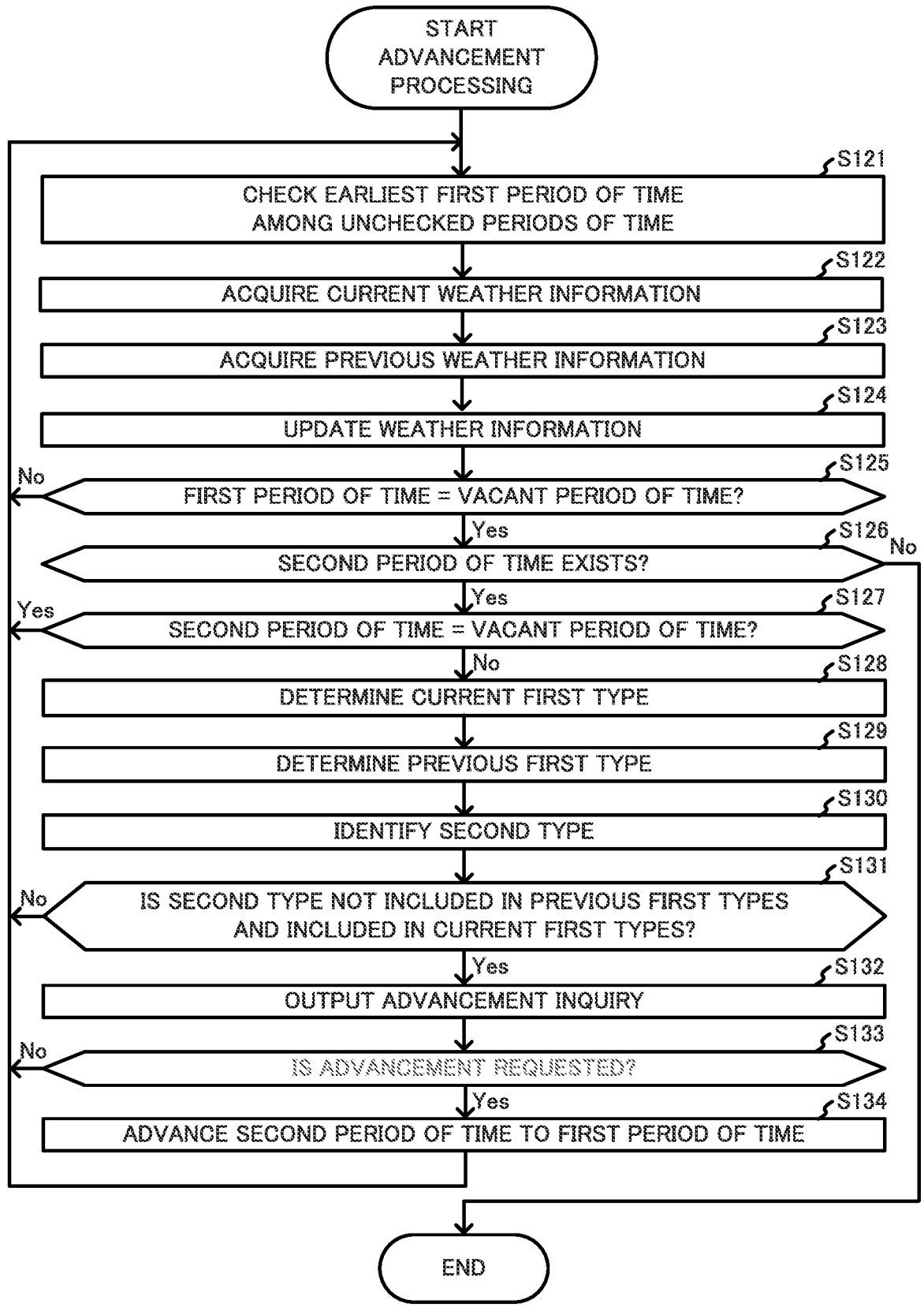
FIG. 24 is a flowchart illustrating an example of advancement processing that an information processing device according to Embodiment 4 executes.

In Embodiment 3, it was described that the information processing device 500 executed advancement processing in FIG. 23 of, with respect to an article that had become not transportable during a specified period of time due to change in weather, advancing the period of time during which the article was to be transported to an earlier period of time. In contrast, an information processing device 500 according to the present embodiment differs from the information processing device 500 according to Embodiment 3 in executing advancement processing, as illustrated in FIG. 24, of, with respect to an article that has become transportable during a period of time earlier than a specified period of time due to change in weather, advancing the period of time during which the article is to be transported to the earlier period of time. Although, hereinbelow, as for the same constituent components as those in Embodiment 3, description will be made using the same reference numerals as those used in Embodiment 3, the description will focus on differences between the present embodiment and Embodiment 3.

When the execution of the advancement processing in FIG. 24 is started, an acquirer 510 of the information processing device 500 acquires, from a plurality of records stored in a schedule table illustrated in FIG. 13, a plurality of pieces of information indicating periods of time. Next, the acquirer 510 sets, as a target of a check, a first period of time that is the earliest among one or a plurality of periods of time that is respectively indicated by the acquired plurality of pieces of information and that has not been checked (step S121).

Next, the same processing as the processing in steps S103 to S105 in FIG. 23 being executed with respect to the first period of time (steps S122 to S124) causes current weather information and previous weather information that indicate forecasted weather in a transport area during the first period of time to be acquired. In the present embodiment, as with Embodiment 3, the current weather information is also referred to as reacquired weather information and the previous weather information is also referred to as previously-acquired weather information.

Subsequently, a determiner 540 of the information processing device 500, by executing the same processing as the processing in step S106 in FIG. 23, determines whether or not the first period of time is a vacant period of time (step S125). On this occasion, when the determiner 540 determines that the first period of time is not a vacant period of time (step S125; No), the determiner 540 determines that, since a first order specifying the first period of time has been accepted, with respect to a second order specifying a second period of time immediately after the first period of time, a period of time during which an article targeted by the second order is to be transported cannot be advanced to the first period of time. Subsequently, the above-described processing is repeated from step S121.

In contrast, when the determiner 540 of the information processing device 500 determines that the first period of time is a vacant period of time (step S125; Yes), the determiner 540 determines whether or not there exists a second period of time that is a period of time immediately after the first period of time (step S126). On this occasion, when the determiner 540 determines that there exists a second period of time (step S126; Yes), the determiner 540, by executing the same processing as the processing in step S125, determines whether or not the second period of time is a vacant period of time (step S127).

On this occasion, when it is determined that the second period of time is a vacant period of time (step S127; Yes), the determiner 540 determines that, since no second order has been accepted, it is not necessary to execute processing of advancing a period of time during which an ordered article is to be transported from the second period of time to the first period of time. Subsequently, the above-described processing is repeated from step S121.

In contrast, when it is determined that the second period of time is not a vacant period of time (step S127; No), the same processing as the processing in steps S32 to S43 in FIG. 14 is executed based on the reacquired weather information (step S128). Through this processing, based on the reacquired weather information, the type of an article that is transportable in the transport area during the first period of time is determined.

Likewise, the same processing as the processing in steps S32 to S43 in FIG. 14 is executed based on the previously-acquired weather information (step S129). Through this processing, based on the previously-acquired weather information, the type of an article that is transportable in the transport area during the first period of time is determined.

Subsequently, the determiner 540 of the information processing device 500 acquires an article ID associated with the information indicating the second period of time in the schedule table in FIG. 13 and acquires type information associated with the acquired article ID in an article table in FIG. 8. Through this processing, the determiner 540 identifies the type of an article targeted by the second order (step S130).

In the description of the present disclosure, the type determined based on the reacquired weather information in step S128 is referred to as a redetermined first type or a current first type. In addition, the type determined based on the previously-acquired weather information in step S129 is referred to as a previously-determined first type or a previous first type. Further, by referring to the type of an article targeted by the second order that is identified in step S130 as a second type, the three types are discriminated from one another.

Next, the determiner 540 of the information processing device 500 determines whether or not the second type is not included in the previously-determined first types and is included in the currently-determined first types (step S131).

The purpose of determining that the second type is not included in the previously-determined first types is to determine that an article targeted by the second order was an article not transportable during the first period of time before a change in forecasted weather. That is, when an article targeted by the second order is an article not transportable during the first period of time, there is a possibility that an orderer who intended to specify transport during the first period of time was not able to specify the first period of time and thus specified the second period of time or such a possibility is higher than a predetermined possibility. Thus, in such a case, there is a possibility that transporting an article targeted by the second order during the first period of time is more convenient for the orderer than transporting the article during the second period of time or such a possibility is higher than a predetermined possibility.

The purpose of determining that the second type is included in the currently-determined first types is to determine whether or not an article targeted by the second order has become an article transportable during the first period of time due to a change in the forecasted weather.

When, in step S131, the determiner 540 of the information processing device 500 determines that the second type is included in the previously-determined first types (step S131; No), the determiner 540 determines that there is no possibility that the first period of time is more convenient for the orderer than the second period of time or such a possibility is equal to or less than a predetermined possibility. Thus, the determiner 540 determines that there is no necessity to execute processing of advancing the period of time during which an article targeted by the second order is to be transported to the first period of time or such a necessity is equal to or less than a predetermined necessity. In addition, when the determiner 540 of the information processing device 500 determines that the second type is not included in the currently-determined first types (step S131; No), the determiner 540 determines that the period of time during which the article targeted by the second order is to be transported cannot be advanced to the first period of time. Subsequently, the above-described processing is repeated from step S121.

In contrast, when it is determined that the second type is not included in the previously-determined first types and the second type is included in the currently-determined first types (step S131; Yes), the determiner 540 determines that there is a possibility that the first period of time is more convenient for the orderer than the second period of time or such a possibility is higher than a predetermined possibility and it is possible to advance the period of time to the first period of time. Next, an outputter 560 of the information processing device 500 generates a message inquiring whether or not the period of time during which the article is to be transported is advanced from the second period of time to the first period of time. Subsequently, the outputter 560 outputs an advancement inquiry including the generated message to a data communication circuit 504a with a terminal device 100 as the destination (step S132).

When the data communication circuit 504a of the information processing device 500 has not received an advancement request when or before a reception time limit is reached, the reception time limit being a time at which a predetermined period has elapsed since a sending time at which the data communication circuit 504a sent an advancement inquiry to the terminal device 100, a controller 570 determines that no advancement of a period of time has been requested (step S133; No). Subsequently, the above-described processing is repeated from step S121.

In contrast, when the data communication circuit 504a of the information processing device 500 receives an advancement request from the terminal device 100 when or before the reception time limit is reached, the controller 570 determines that advancement of a period of time is requested (step S133; Yes). Next, the acceptor 550 acquires an article ID associated with information indicating the second period of time in the schedule table in FIG. 13, associates the acquired article ID with information indicating the first period of time, and stores the associated information. Subsequently, the acceptor 550 updates the article ID associated with the information indicating the second period of time with characters "NULL" in the schedule table. Through this processing, the acceptor 550 accepts the advancement request and advances the period of time during which the article is to be transported from the second period of time to the first period of time that is earlier than the second period of time and during which the article is transportable (step S134). Subsequently, the above-described processing is repeated from step S121.

When, in step S126, it is determined that there exists no second period of time (step S126; No), the execution of the advancement processing is terminated.

According to the above-described configuration, the determiner 540 of the information processing device 500 includes the outputter 560 that, when previously-acquired weather information and reacquired weather information are different from each other and a second type that is a type of an article targeted by a second order is not included in previously-determined first types, but is included in redetermined first types, outputs an inquiry inquiring whether or not a period of time during which the article is to be transported is advanced from a second period of time to a first period of time. Thus, since the information processing device 500 can propose to advance a period of time during which an article is to be transported to a period of time that has a possibility to be convenient for an orderer or a period of time for which such a possibility is higher than a predetermined possibility, the information processing device 500 is capable of improving convenience for the orderer.

Embodiments 1 to 4 and Modified Examples 1 to 18 of Embodiment 1 can be combined with one another. It is possible not only to provide an information processing device 500 that includes a configuration for achieving functions according to any one of Embodiments 1 to 4 and Modified Examples 1 to 18 of Embodiment 1 but also to provide a system that is constituted by a plurality of devices and that, as a whole system, includes a configuration for achieving functions according to any one of Embodiments 1 to 4 and Modified Examples 1 to 18 of Embodiment 1.

It is also possible to, by applying a program, cause an existing information processing device to function as the information processing device 500 according to any one of Embodiments 1 to 4 and Modified Examples 1 to 18 of Embodiment 1. That is, it is possible to, by applying a program for achieving various functional configurations of the information processing device 500 exemplified in any one of Embodiments 1 to 4 and Modified Examples 1 to 18 of Embodiment 1 in such a way that a computer (CPU or the like) controlling an existing control device can execute the program, cause the existing control device to function as the information processing device 500 according any one of Embodiments 1 to 4 and Modified Examples 1 to 18 of Embodiment 1.

Any distribution method of such a program can be used, and the program can be stored and distributed in a recording medium, such as a memory card, a compact disc read-only memory (CD-ROM), and a digital versatile disk read-only memory (DVD-ROM), or can be distributed via a communication medium, such as the Internet. In addition, a method according to the present disclosure can be implemented using the information processing device 500 according to any one of Embodiments 1 to 4 and Modified Examples 1 to 18 of Embodiment 1 and the transport system 1 according to any one of Embodiments 1 to 4 and Modified Examples 1 to 18 of Embodiment 1.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

Appendices

Appendix 1

An information processing device characterized by including:

an acquirer that acquires weather information indicating weather in an area in which a vehicle is scheduled to move; and a determiner that, based on the acquired weather information, determines a type of an article that is transportable by the vehicle in the area.

Appendix 2

The information processing device according to appendix 1 characterized by further including:

an acceptor that accepts an order for an article of the determined type and restricts acceptance of an order for an article of a type different from the determined type.

Appendix 3

The information processing device according to appendix 1 or 2, characterized in that the determiner, based on vehicle performance of the vehicle and the acquired weather information, determines the type of the article that is transportable by the vehicle in the area.

Appendix 4

The information processing device according to appendix 3 characterized by further including:

an identifier that identifies the vehicle that is scheduled to move out of a plurality of vehicles that has different vehicle performances, wherein the determiner, based on the vehicle performance of the identified vehicle and the acquired weather information, determines the type of the article that is transportable by the vehicle in the area.

Appendix 5

The information processing device according to appendix 1, characterized in that the acquirer acquires:

weather information indicating forecasted weather in the area during a first period of time; and weather information indicating forecasted weather in the area during a second period of time immediately after the first period of time, the information processing device further includes an identifier that, out of a plurality of vehicles that has different vehicle performances, identifies:

a first vehicle that is the vehicle and is scheduled to move during the first period of time; and a second vehicle that is a vehicle that is different from or a same as the first vehicle and is scheduled to move during the second period of time, the determiner based on vehicle performance of the identified first vehicle and the weather information for the first period of time, determines a first type that is a type of an article that is transportable by the first vehicle in the area during the first period of time, and based on vehicle performance of the second vehicle and the weather information for the second period of time, determines a second type that is a type of an article that is transportable by the second vehicle in the area during the second period of time, the information processing device further includes an acceptor that among first orders that specify transport during the first period of time, accepts an order for an article of the determined first type and restricts acceptance of an order for an article of a type different from the first type, and among second orders that specify transport during the second period of time, accepts an order for an article of the second type and restricts acceptance of an order for an article of a type different from the second type, the acquirer acquires weather information for the first period of time again, when the weather information that was previously acquired and the weather information that is acquired again are different from each other, the determiner, based on the weather information that is acquired again and the vehicle performance of the first vehicle, determines a first type again, and the information processing device further includes an outputter that, when a type of the article targeted by the second order is not included in the first type that is previously determined and included in the first type that is determined again, outputs an inquiry inquiring whether or not a period of time during which the article is to be transported is advanced from the second period of time to the first period of time.

Appendix 6

The information processing device according to any one of appendices 1 to 5, characterized in that the acquirer further acquires information indicating a transport destination specified by a user, and based on the acquired information indicating the transport destination, acquires the weather information.

Appendix 7

The information processing device according to any one of appendices 1 to 6, characterized in that the vehicle is an unmanned aircraft.

Appendix 8

The information processing device according to appendix 1, characterized in that articles that are transportable by the vehicle include an article that is kept in a deliverable state during transport by the vehicle, and the determiner from a storage (i) that stores a plurality of pieces of information in each of which type information indicating a type of an article and condition information indicating a condition that changes a state of the article to a state different from a deliverable state are associated with each other and (ii) that stores a plurality of pieces of information in each of which weather information indicating weather and a condition information indicating a condition generated by the weather are associated with each other, acquires the condition information associated with the acquired weather information and acquires the type information associated with the acquired condition information, and determines, to be the type of the transportable article, the type indicated by the type information that is different from the acquired type information and that is among the type information stored in the storage.

Appendix 9

The information processing device according to appendix 8, characterized in that the vehicle has vehicle performance to protect an article stored in a body of the vehicle from the condition generated by the weather, the storage further stores condition information indicating the condition from which the article is protected by the vehicle performance of the vehicle, and the determiner from the storage, acquires the condition information associated with the acquired weather information, excludes the condition information related to the vehicle from the acquired condition information, acquires the type information associated with the condition information after exclusion, and determines, to be the type of the transportable article, the type indicated by the type information that is different from the acquired type information and that is among the type information stored in the storage.

Appendix 10

The information processing device according to appendix 9, characterized in that the deliverable states of the article include at least one of a state in which the article normally operates, a state in which the article is dry, or a state in which temperature of the article is within a predetermined range, the weather includes at least one of weather in which wind having a speed faster than a predetermined speed blows, weather in which rain or snow falls, or weather in which atmospheric temperature is lower or higher than a predetermined temperature, the conditions that cause the deliverable state of the article to change and the conditions generated by the weather include at least one of a condition in which shaking occurs, a condition in which wetting occurs, a low temperature condition in which temperature is lower than a predetermined temperature, or a high temperature condition in which temperature is higher than a predetermined temperature, and the vehicle performance includes at least one of wind-resistant performance to suppress shaking of the article, splash-proof performance or waterproof performance to suppress wetting of the article, heat retention performance to suppress temperature reduction of the article, or cold retention performance to suppress rise in temperature of the article.

Appendix 11

The information processing device according to any one of appendices 1 to 10 characterized by further including:

a controller that performs control of causing the vehicle to transport an article of the determined type.

Appendix 12

A system characterized by including:

a vehicle;

an acquirer that acquires weather information indicating weather in an area in which the vehicle is scheduled to move; and a determiner that, based on the acquired weather information, determines a type of an article that is transportable by the vehicle in the area.

Appendix 13

A method characterized by including:

acquiring, by an information processing device or a system, weather information indicating weather in an area in which a vehicle is scheduled to move; and determining, by the information processing device or the system, based on the acquired weather information, a type of an article that is transportable by the vehicle in the area.

REFERENCE SIGNS LIST

1 Transport system
100 Terminal device
101, 501, 811 CPU
102, 502, 812 RAM
103a, 503a, 813a ROM
103b, 813b Flash memory
104a, 504a, 814a Data communication circuit
104b Voice communication circuit
105a, 505a, 815a Video card
105b, 505b, 815b Display device
105c, 505c, 815c Input device
106, 816 Location measurement circuit
109a Speaker
109b Microphone
500 Information processing device
503b Hard disk
510 Acquirer
520 Authenticator
530 Identifier
540 Determiner
550 Acceptor
560 Outputter
570 Controller
590 Information storage
600, 700, 800, 900 Vehicle
601, 602, 701, 702 Wheel
605, 705 Vehicle body
610, 710, 810, 910 Control device
640, 740, 840 Storage cabinet
651, 751, 851, 951 LiDAR sensor
821 to 824, 921 to 924 Propeller arm
831 to 834, 931 to 934 Propeller
843, 943 Support leg
818 Input/output port
819 Drive circuit
941a First holding frame
941b Second holding frame
942a, 942b Guide rail
IN Internet

The invention claimed is:

1. An information processing device comprising:
at least one memory storing computer program code; and
at least one processor configured to operate as instructed by the computer program code,
wherein the computer program code comprises:
acquirer code configured to cause at least one of the at least one processor to acquire weather information indicating forecasted weather during a first period of time in an area in which a first vehicle is scheduled to move; and
determiner code configured to cause at least one of the at least one processor to, based on vehicle performance of the first vehicle scheduled to move during the first period of time and the acquired weather information for the first period of time, determine a first type that is a type of an article that is transportable by the first vehicle during the first period of time in the area,
wherein the acquirer code is further configured to cause at least one of the at least one processor to acquire weather information for the first period of time again,
wherein the determiner code is further configured to cause at least one of the at least one processor to, when the weather information for the first period of time that is previously acquired and the weather information for the first period of time that is acquired again are different, determine the first type again based on the weather information for the first period of time that is acquired again and the vehicle performance of the first vehicle, and
wherein the computer program code further comprises controller code configured to cause at least one of the at least one processor to, when (i) an order specifying transport during a second period of time immediately after the first period of time is accepted, a second vehicle that is a vehicle that is different from or a same vehicle as the first vehicle being scheduled to move during the second period of time, and (ii) a type of an article targeted by the order is not included in the first type that is previously determined and included in the first type that is determined again, perform control of causing the first vehicle or the second vehicle to transport the article targeted by the order during the first period of time.

2. The information processing device according to claim 1, wherein the acquirer code is further configured to cause at least one of the at least one processor to
further acquire information indicating a transport destination specified by a user, and
based on the acquired information indicating the transport destination, acquire the weather information.

3. The information processing device according to claim 1, wherein the first vehicle is an unmanned aircraft.

4. An information processing device comprising:
at least one memory storing computer program code; and
at least one processor configured to operate as instructed by the computer program code,
wherein the computer program code comprises:
acquirer code configured to cause at least one of the at least one processor to acquire weather information indicating weather in an area in which a vehicle is scheduled to move;
determiner code configured to cause at least one of the at least one processor to:
from a storage (i) that stores (a) type information indicating a first type and condition information indicating a first condition that changes a state of an article of the first type to a state different from a deliverable state in association with each other and (b) type information indicating a second type and condition information indicating a second condition that changes a state of an article of the second type to a state different from a deliverable state in association with each other, and (ii) that stores (a) weather information indicating first weather and condition information indicating a third condition generated by the first weather in association with each other and (b) weather information indicating second weather and condition information indicating a fourth condition generated by the second weather in association with each other:
when the weather in the area indicated by the acquired weather information is a same weather as the first weather, acquire the condition information indicating the third condition that is associated with the weather information indicating the first weather, and
when the third condition indicated by the acquired condition information is a same condition as the second condition, acquire the type information indicating the second type that is associated with the condition information indicating the second condition, and
determine, out of the first type and the second type that are each indicated by the type information stored in the storage, as a type of article that is transportable by the vehicle in the area for which the first weather is forecasted, the first type that is different from the second type indicated by the acquired type information; and
controller code configured to cause at least one of the at least one processor to perform control of causing the vehicle to transport the article of the determined type.

5. The information processing device according to claim 4, wherein the vehicle has vehicle performance to protect an article stored in a body of the vehicle from a fifth condition,
wherein the storage further stores condition information indicating the fifth condition from which the article is protected by the vehicle performance of the vehicle,
wherein the determiner code is further configured to cause at least one of the at least one processor to, when the weather in the area that is indicated by the acquired weather information is a same weather as the second weather, acquire, from the storage, the condition information indicating the fourth condition that is associated with the weather information indicating the second weather,
wherein the fourth condition includes a sixth condition and a seventh condition that are generated by the second weather, and
wherein the determiner code is further configured to cause at least one of the at least one processor to:
when the fifth condition from which the article is protected is a same condition as the sixth condition generated by the second weather, determine that a condition that is included in the fourth condition indicated by the acquired condition information and that is different from the sixth condition is the seventh condition,
when the determined seventh condition is a same condition as the second condition, acquire the type information indicating the second type that is associated with the condition information indicating the second condition, and
determine, out of the first type and the second type that are each indicated by the type information stored in the storage, as a type of article that is transportable by the vehicle in the area for which the second weather is forecasted, the first type that is different from the second type indicated by the acquired type information.

6. The information processing device according to claim 5, wherein the deliverable state of the article includes at least one of a state in which the article normally operates, a state in which the article is dry, or a state in which temperature of the article is within a predetermined range,
wherein the weather includes at least one of weather in which wind having a speed faster than a predetermined speed blows, weather in which rain or snow falls, or weather in which atmospheric temperature is lower or higher than a predetermined temperature,
wherein the first condition, the second condition, the third condition, the fourth condition, the fifth condition, the sixth condition, and the seventh condition include at least one of a condition in which shaking occurs, a condition in which wetting occurs, a low temperature condition in which temperature is lower than a predetermined temperature, or a high temperature condition in which temperature is higher than a predetermined temperature, and
wherein the vehicle performance includes at least one of wind-resistant performance to suppress shaking of the article, splash-proof performance or waterproof performance to suppress wetting of the article, heat retention performance to suppress temperature reduction of the article, or cold retention performance to suppress rise in temperature of the article.

7. A system comprising:
a first vehicle;
at least one memory storing computer program code; and
at least one processor configured to operate as instructed by the computer program code,
wherein the computer program code comprises:
acquirer code configured to cause at least one of the at least one processor to acquire weather information indicating forecasted weather during a first period of time in an area in which the first vehicle is scheduled to move; and
determiner code configured to cause at least one of the at least one processor to, based on vehicle performance of the first vehicle scheduled to move during the first period of time and the acquired weather information for the first period of time, determine a first type that is a type of an article that is transportable by the first vehicle during the first period of time in the area,
wherein the acquirer code is further configured to cause at least one of the at least one processor to acquire weather information for the first period of time again,
wherein the determiner code is further configured to cause at least one of the at least one processor to, when the weather information for the first period of time that is previously acquired and the weather information for the first period of time that is acquired again are different, determine the first type again based on the weather information for the first period of time that is acquired again and the vehicle performance of the first vehicle, and
wherein the computer program code further comprises controller code configured to cause at least one of the at least one processor to, when (i) an order specifying transport during a second period of time immediately after the first period of time is accepted, a second vehicle that is a vehicle that is different from or a same vehicle as the first vehicle being scheduled to move during the second period of time, and (ii) a type of an article targeted by the order is not included in the first type that is previously determined and included in the first type that is determined again, perform control of causing the first vehicle or the second vehicle to transport the article targeted by the order during the first period of time.

8. The information processing device according to claim 1, wherein the acquirer code is further configured to cause at least one of the at least one processor to acquire weather information indicating forecasted weather during the second period of time in the area,
  wherein the determiner code is further configured to cause at least one of the at least one processor to determine, based on vehicle performance of the second vehicle and the acquired weather information for the second period of time, a second type that is a type of an article that is transportable by the second vehicle during the second period of time in the area, and
  wherein the computer program code further comprises acceptor code configured to cause at least one of the at least one processor to, within a period of time from when the weather information for the first period of time is previously acquired until when the weather information for the first period of time is acquired again:
    among orders that specify transport during the first period of time, accept an order for an article of the first type that is previously determined and restrict acceptance of an order for an article of a type different from the first type that is previously determined, and
    among orders that specify transport during the second period of time, accept an order for an article of the second type and restrict acceptance of an order for an article of a type different from the second type.

9. The information processing device according to claim 8, wherein the computer program code further comprises outputter code configured to cause at least one of the at least one processor to, when the type of the article targeted by the order specifying transport during the second period of time is not included in the first type that is previously determined and included in the first type that is determined again, output an inquiry inquiring whether or not a period of time during which the article targeted by the order is to be transported is advanced from the second period of time to the first period of time,
  wherein the information processing device further comprises a communication circuit configured to receive an advancement request requesting for advancing from the second period of time to the first period of time, and
  wherein the acceptor code is further configured to cause at least one of the at least one processor to, upon the advancement request being received, advance the period of time during which the article is to be transported from the second period of time to the first period of time.

10. The information processing device according to claim 9, wherein the computer program code further comprises identification code configured to cause at least one of the at least one processor to identify, out of a plurality of vehicles,
  (i) the first vehicle that is scheduled to move during the first period of time; and
  (ii) the second vehicle that is scheduled to move during the second period of time, and
  wherein each of the plurality of vehicles has vehicle performance, and the plurality of vehicles differ from each other in the vehicle performance.

11. The system according to claim 7, wherein the acquirer code is further configured to cause at least one of the at least one processor to acquire weather information indicating forecasted weather during the second period of time in the area,
  wherein the determiner code is further configured to cause at least one of the at least one processor to determine, based on vehicle performance of the second vehicle and the acquired weather information for the second period of time, a second type that is a type of an article that is transportable by the second vehicle during the second period of time in the area, and
  wherein the computer program code further comprises acceptor code configured to cause at least one of the at least one processor to, within a period of time from when the weather information for the first period of time is previously acquired until when the weather information for the first period of time is acquired again:
    among orders that specify transport during the first period of time, accept an order for an article of the first type that is previously determined and restrict acceptance of an order for an article of a type different from the first type that is previously determined, and
    among orders that specify transport during the second period of time, accept an order for an article of the second type and restrict acceptance of an order for an article of a type different from the second type.

12. The system according to claim 11, wherein the computer program code further comprises outputter code configured to cause at least one of the at least one processor to, when the type of the article targeted by the order specifying transport during the second period of time is not included in the first type that is previously determined and included in the first type that is determined again, output an inquiry inquiring whether or not a period of time during which the article targeted by the order is to be transported is advanced from the second period of time to the first period of time,
  wherein the system further comprises a communication circuit configured to receive an advancement request requesting for advancing from the second period of time to the first period of time, and
  wherein the acceptor code is further configured to cause at least one of the at least one processor to, upon the advancement request being received, advance the period of time during which the article is to be transported from the second period of time to the first period of time.

13. The system according to claim 12, wherein the computer program code further comprises identification code configured to cause at least one of the at least one processor to identify, out of a plurality of vehicles:
  (i) the first vehicle that is scheduled to move during the first period of time; and
  (ii) the second vehicle that is scheduled to move during the second period of time, and
  wherein each of the plurality of vehicles has vehicle performance, and the plurality of vehicles differ from each other in the vehicle performance.

* * * * *